(12) United States Patent
Haskell

(10) Patent No.: US 8,976,856 B2
(45) Date of Patent: Mar. 10, 2015

(54) OPTIMIZED DEBLOCKING FILTERS

(75) Inventor: Barin Geoffry Haskell, Mountain View, CA (US)

(73) Assignee: Apple Inc., Cupertino, CA (US)

(*) Notice: Subject to any disclaimer, the term of this patent is extended or adjusted under 35 U.S.C. 154(b) by 304 days.

(21) Appl. No.: 12/895,688

(22) Filed: Sep. 30, 2010

(65) Prior Publication Data

US 2012/0082236 A1 Apr. 5, 2012

(51) Int. Cl.
| | |
|---|---|
| H04N 7/26 | (2006.01) |
| H04N 19/86 | (2014.01) |
| H04N 19/117 | (2014.01) |
| H04N 19/102 | (2014.01) |
| H04N 19/189 | (2014.01) |
| H04N 19/82 | (2014.01) |
| H04N 19/61 | (2014.01) |

(52) U.S. Cl.
CPC ....... *H04N 7/26888* (2013.01); *H04N 7/26058* (2013.01); *H04N 7/26074* (2013.01); *H04N 7/26313* (2013.01); *H04N 7/26382* (2013.01); *H04N 7/50* (2013.01)
USPC .......................................................... 375/240

(58) Field of Classification Search
USPC .................................................. 375/240.12
See application file for complete search history.

(56) References Cited

U.S. PATENT DOCUMENTS

| | | | |
|---|---|---|---|
| 4,958,226 A | | 9/1990 | Haskell et al. |
| 5,241,471 A | * | 8/1993 | Trousset et al. ............... 382/274 |
| 5,313,204 A | | 5/1994 | Semasa et al. |
| 5,408,328 A | | 4/1995 | Boliek et al. |
| 5,414,469 A | | 5/1995 | Gonzales et al. |
| 5,465,119 A | | 11/1995 | Demos |
| 5,467,136 A | | 11/1995 | Odaka et al. |

(Continued)

FOREIGN PATENT DOCUMENTS

| | | |
|---|---|---|
| EP | 0 854 652 A1 | 7/1998 |
| EP | 0910219 A2 | 4/1999 |

(Continued)

OTHER PUBLICATIONS

International Search Report, dated Sep. 24, 2012, from corresponding International Patent Application No. PCT/US2011/047205 filed Aug. 10, 2011.

(Continued)

*Primary Examiner* — Dave Czekaj
*Assistant Examiner* — Kehinde O Abimbola
(74) *Attorney, Agent, or Firm* — Kenyon & Kenyon LLP

(57) ABSTRACT

An encoder executes an iterative search method for selecting deblocking parameters for coded video. According to the method, a decoded picture may be deblocked according to parameters associated with a multi-dimensional deblocking vector and an error, called the "deblocking error" may be estimated therefrom. If the estimated error exceeds a predetermined threshold, then alternate deblocking vectors may be created, each advanced from the current deblocking vector in a respective dimension. The method may deblock the decoded picture according to each advanced vector and may estimate errors from each of the deblocking of each advanced vector. Finally, the deblocking vector may be revised for a next iteration according to a gradient derived from the estimated deblocking errors of the vector dimensions. This gradient-based search method may converge on a final set of deblocking parameters in an efficient manner.

30 Claims, 9 Drawing Sheets

(56) References Cited

U.S. PATENT DOCUMENTS

| | | |
|---|---|---|
| 5,488,418 A | 1/1996 | Mishima et al. |
| 5,532,747 A | 7/1996 | Yoon et al. |
| 5,539,468 A | 7/1996 | Suzuki et al. |
| 5,612,735 A | 3/1997 | Haskell et al. |
| 5,619,256 A | 4/1997 | Haskell et al. |
| 5,633,684 A | 5/1997 | Teranishi et al. |
| 5,673,210 A * | 9/1997 | Etter ............................ 702/69 |
| 5,699,117 A | 12/1997 | Uramoto et al. |
| 5,742,343 A | 4/1998 | Haskell et al. |
| 5,757,971 A | 5/1998 | Kim |
| 5,778,097 A | 7/1998 | Nickerson |
| 5,786,855 A | 7/1998 | Chen et al. |
| 5,825,421 A | 10/1998 | Tan |
| 5,886,736 A | 3/1999 | Chen |
| 5,905,579 A | 5/1999 | Katayama et al. |
| 5,952,943 A | 9/1999 | Walsh et al. |
| 5,978,509 A | 11/1999 | Nachtergaele et al. |
| 5,999,189 A | 12/1999 | Kajiya et al. |
| 6,005,623 A | 12/1999 | Takahashi et al. |
| 6,005,980 A | 12/1999 | Eifrig et al. |
| 6,026,183 A | 2/2000 | Talluri et al. |
| 6,043,846 A | 3/2000 | Shen et al. |
| 6,057,884 A | 5/2000 | Chen et al. |
| 6,097,842 A | 8/2000 | Suzuki et al. |
| 6,144,701 A | 11/2000 | Chiang et al. |
| 6,148,026 A | 11/2000 | Puri et al. |
| 6,226,410 B1 | 5/2001 | O'Rourke |
| 6,233,356 B1 | 5/2001 | Haskell et al. |
| 6,266,817 B1 | 7/2001 | Chaddha |
| 6,301,385 B1 | 10/2001 | Chen et al. |
| 6,310,857 B1 | 10/2001 | Duffield et al. |
| 6,317,131 B2 | 11/2001 | Basso et al. |
| 6,330,280 B1 | 12/2001 | Suzuki et al. |
| 6,347,116 B1 | 2/2002 | Haskell et al. |
| 6,404,813 B1 * | 6/2002 | Haskell et al. ............ 375/240.12 |
| 6,412,011 B1 | 6/2002 | Agraharam et al. |
| 6,459,731 B1 * | 10/2002 | Matthews et al. ......... 375/240.03 |
| 6,526,177 B1 | 2/2003 | Haskell et al. |
| 6,542,549 B1 | 4/2003 | Tan et al. |
| 6,556,625 B2 | 4/2003 | Haskell et al. |
| 6,580,832 B1 | 6/2003 | Kim et al. |
| 6,678,416 B1 * | 1/2004 | Sun et al. ...................... 382/235 |
| 6,693,957 B1 * | 2/2004 | Wingrove et al. .............. 375/222 |
| 6,704,360 B2 * | 3/2004 | Haskell et al. ............ 375/240.12 |
| 6,707,949 B2 | 3/2004 | Haskell et al. |
| 6,728,315 B2 * | 4/2004 | Haskell et al. ............ 375/240.16 |
| 6,731,811 B1 | 5/2004 | Rose |
| 6,748,113 B1 * | 6/2004 | Kondo et al. ................... 382/232 |
| 6,993,201 B1 | 1/2006 | Haskell et al. |
| 7,030,784 B2 | 4/2006 | Schouhamer Immink |
| 7,068,722 B2 * | 6/2006 | Wells ....................... 375/240.16 |
| 7,227,901 B2 * | 6/2007 | Joch et al. ................ 375/240.29 |
| 7,283,588 B2 * | 10/2007 | Bjontegaard .............. 375/240.01 |
| 7,324,604 B2 * | 1/2008 | Molisch et al. ................ 375/296 |
| 7,352,812 B2 * | 4/2008 | Sun et al. ................. 375/240.16 |
| 7,355,530 B2 | 4/2008 | Labelle |
| 7,386,049 B2 * | 6/2008 | Garrido et al. ........... 375/240.15 |
| 7,397,853 B2 * | 7/2008 | Kwon et al. .............. 375/240.03 |
| 7,397,854 B2 * | 7/2008 | Kwon et al. .............. 375/240.03 |
| 7,400,679 B2 * | 7/2008 | Kwon et al. .............. 375/240.03 |
| 7,456,760 B2 | 11/2008 | Normile et al. |
| 7,457,362 B2 | 11/2008 | Sankaran |
| 7,457,474 B1 * | 11/2008 | Haskell et al. ................. 382/243 |
| 7,460,596 B2 * | 12/2008 | Kwon et al. .............. 375/240.03 |
| 7,496,141 B2 * | 2/2009 | Kwon et al. .............. 375/240.03 |
| 7,522,774 B2 * | 4/2009 | Ramasastry et al. .......... 382/232 |
| 7,535,383 B2 | 5/2009 | Segall et al. |
| 7,539,248 B2 * | 5/2009 | Kwon et al. .............. 375/240.24 |
| 7,590,179 B2 * | 9/2009 | Mukerjee ................. 375/240.15 |
| 7,636,490 B2 * | 12/2009 | Li ................................... 382/268 |
| 7,656,318 B2 | 2/2010 | Guleryuz et al. |
| 7,715,589 B2 * | 5/2010 | Freeman et al. ............... 382/103 |
| 7,760,953 B2 * | 7/2010 | Takei ............................. 382/236 |
| 7,805,005 B2 * | 9/2010 | Simental et al. ............... 382/191 |
| 7,852,936 B2 * | 12/2010 | Mukerjee et al. ........ 375/240.15 |
| 7,860,160 B2 * | 12/2010 | Shimazaki et al. ....... 375/240.03 |
| 7,864,177 B2 * | 1/2011 | Bunnell ......................... 345/426 |
| 7,881,541 B2 * | 2/2011 | Kashima et al. ............... 382/232 |
| 7,881,542 B2 * | 2/2011 | Kashima et al. ............... 382/232 |
| 7,894,526 B2 * | 2/2011 | Kadono et al. ........... 375/240.16 |
| 7,908,627 B2 * | 3/2011 | Ansari et al. ..................... 725/90 |
| 7,924,910 B2 * | 4/2011 | Bhoja et al. ..................... 375/233 |
| 7,929,610 B2 * | 4/2011 | Sun ............................ 375/240.16 |
| 7,949,044 B2 * | 5/2011 | Winger et al. ............ 375/240.03 |
| 7,969,333 B2 | 6/2011 | Normile et al. |
| 7,974,346 B2 * | 7/2011 | Haskell et al. ............. 375/240.2 |
| 7,995,659 B2 * | 8/2011 | Chen et al. ............... 375/240.25 |
| 8,004,563 B2 * | 8/2011 | Talmon et al. ................. 348/155 |
| 8,081,682 B1 * | 12/2011 | Carbacea et al. ......... 375/240.24 |
| 8,081,842 B2 * | 12/2011 | Lu et al. .......................... 382/288 |
| 8,090,026 B2 * | 1/2012 | Haskell et al. ............ 375/240.23 |
| 8,094,724 B2 * | 1/2012 | Haskell et al. ............ 375/240.23 |
| 8,116,379 B2 * | 2/2012 | Dang ........................ 375/240.24 |
| 8,126,283 B1 * | 2/2012 | Garbacea et al. .............. 382/243 |
| 8,130,828 B2 * | 3/2012 | Hsu et al. .................. 375/240.03 |
| 8,195,001 B2 * | 6/2012 | Chiu et al. ...................... 382/275 |
| 8,204,128 B2 * | 6/2012 | Huchet et al. ............ 375/240.18 |
| 8,213,495 B2 * | 7/2012 | Kadono et al. .................. 375/240 |
| 8,218,622 B2 * | 7/2012 | Xie ............................ 375/240.01 |
| 8,218,646 B2 * | 7/2012 | Murakami et al. ....... 375/240.24 |
| 8,243,815 B2 * | 8/2012 | Hussain et al. ........... 375/240.22 |
| 8,244,479 B2 * | 8/2012 | Kain et al. ....................... 702/20 |
| 8,254,455 B2 * | 8/2012 | Wu et al. ................... 375/240.16 |
| RE43,628 E * | 9/2012 | Sun et al. .................. 375/240.16 |
| 8,270,466 B2 * | 9/2012 | Paniconi et al. ................. 375/240 |
| 8,270,498 B2 * | 9/2012 | Filippini et al. ......... 375/240.27 |
| 2001/0041015 A1 | 11/2001 | Chui |
| 2001/0043731 A1 | 11/2001 | Ito et al. |
| 2002/0031276 A1 | 3/2002 | Yagishita et al. |
| 2002/0146072 A1 * | 10/2002 | Sun et al. .................. 375/240.16 |
| 2002/0154699 A1 | 10/2002 | Yamaguchi et al. |
| 2003/0158979 A1 | 8/2003 | Tateyama et al. |
| 2003/0198294 A1 | 10/2003 | Zaccarin |
| 2004/0008898 A1 | 1/2004 | Song et al. |
| 2004/0076237 A1 * | 4/2004 | Kadono et al. ........... 375/240.29 |
| 2004/0101059 A1 | 5/2004 | Joch et al. |
| 2004/0158878 A1 | 8/2004 | Ratnakar et al. |
| 2004/0196374 A1 | 10/2004 | Billerbeck |
| 2005/0024651 A1 | 2/2005 | Yu et al. |
| 2005/0035886 A1 | 2/2005 | Labelle |
| 2005/0117653 A1 * | 6/2005 | Sankaran .................. 375/240.24 |
| 2005/0163400 A1 | 7/2005 | Suga et al. |
| 2005/0175103 A1 * | 8/2005 | Sun et al. .................. 375/240.16 |
| 2005/0195901 A1 | 9/2005 | Pohjola et al. |
| 2005/0201469 A1 | 9/2005 | Sievers et al. |
| 2005/0201627 A1 | 9/2005 | Liang et al. |
| 2005/0243911 A1 * | 11/2005 | Kwon et al. .............. 375/240.03 |
| 2005/0243912 A1 * | 11/2005 | Kwon et al. .............. 375/240.03 |
| 2005/0243913 A1 * | 11/2005 | Kwon et al. .............. 375/240.03 |
| 2005/0243914 A1 * | 11/2005 | Kwon et al. .............. 375/240.03 |
| 2005/0243915 A1 * | 11/2005 | Kwon et al. .............. 375/240.03 |
| 2005/0243916 A1 * | 11/2005 | Kwon et al. .............. 375/240.03 |
| 2005/0244063 A1 * | 11/2005 | Kwon et al. .................... 382/233 |
| 2005/0249285 A1 | 11/2005 | Chen et al. |
| 2005/0262531 A1 * | 11/2005 | Varma et al. ..................... 725/35 |
| 2006/0010296 A1 * | 1/2006 | Dent ............................... 711/147 |
| 2006/0029288 A1 * | 2/2006 | Li ..................................... 382/268 |
| 2006/0051068 A1 * | 3/2006 | Gomila ............................ 386/114 |
| 2006/0078048 A1 * | 4/2006 | Bjontegaard ............. 375/240.03 |
| 2006/0078052 A1 * | 4/2006 | Dang ........................ 375/240.24 |
| 2006/0093042 A1 * | 5/2006 | Kashima et al. ......... 375/240.24 |
| 2006/0093043 A1 * | 5/2006 | Kashima et al. ......... 375/240.24 |
| 2006/0098738 A1 | 5/2006 | Cosman et al. |
| 2006/0104357 A1 * | 5/2006 | Burazerovic et al. ..... 375/240.15 |
| 2006/0153302 A1 * | 7/2006 | Esaki ........................ 375/240.24 |
| 2006/0165168 A1 | 7/2006 | Boyce et al. |
| 2006/0239360 A1 * | 10/2006 | Kadono et al. ........... 375/240.27 |
| 2006/0256872 A1 * | 11/2006 | Esaki ........................ 375/240.27 |
| 2007/0091997 A1 * | 4/2007 | Fogg et al. .................. 375/240.1 |
| 2007/0116124 A1 | 5/2007 | Wu et al. |
| 2007/0116126 A1 | 5/2007 | Haskell et al. |
| 2007/0136779 A1 * | 6/2007 | Tsushima ........................ 725/131 |
| 2007/0160129 A1 | 7/2007 | Fujisawa et al. |
| 2007/0183496 A1 * | 8/2007 | Kadono et al. ........... 375/240.08 |

(56) References Cited

U.S. PATENT DOCUMENTS

| | | | |
|---|---|---|---|
| 2007/0217503 A1 | 9/2007 | Haskell et al. | |
| 2007/0237241 A1 | 10/2007 | Ha et al. | |
| 2007/0291858 A1* | 12/2007 | Hussain et al. | 375/240.29 |
| 2008/0031336 A1 | 2/2008 | Yamaguchi | |
| 2008/0031356 A1 | 2/2008 | Uchida et al. | |
| 2008/0043831 A1* | 2/2008 | Sethuraman et al. | 375/240 |
| 2008/0049843 A1* | 2/2008 | Kadono et al. | 375/240.24 |
| 2008/0055623 A1 | 3/2008 | Piersol et al. | |
| 2008/0062018 A1 | 3/2008 | Normile et al. | |
| 2008/0069245 A1* | 3/2008 | Kadono et al. | 375/240.24 |
| 2008/0095238 A1 | 4/2008 | Wu et al. | |
| 2008/0130761 A1* | 6/2008 | Kadono et al. | 375/240.27 |
| 2008/0137752 A1* | 6/2008 | He | 375/240.24 |
| 2008/0137753 A1* | 6/2008 | He | 375/240.24 |
| 2008/0152009 A1 | 6/2008 | Akyol et al. | |
| 2008/0181298 A1 | 7/2008 | Shi et al. | |
| 2008/0232452 A1* | 9/2008 | Sullivan et al. | 375/232 |
| 2008/0253461 A1 | 10/2008 | Lin et al. | |
| 2008/0253463 A1 | 10/2008 | Lin et al. | |
| 2008/0259081 A1* | 10/2008 | Bunnell | 345/426 |
| 2008/0266427 A1* | 10/2008 | Ferguson et al. | 348/246 |
| 2008/0267297 A1 | 10/2008 | Sampedro et al. | |
| 2009/0003447 A1* | 1/2009 | Christoffersen et al. | 375/240.16 |
| 2009/0034622 A1* | 2/2009 | Huchet et al. | 375/240.16 |
| 2009/0103625 A1* | 4/2009 | Lee et al. | 375/240.24 |
| 2009/0141814 A1 | 6/2009 | Yin et al. | |
| 2009/0161770 A1 | 6/2009 | Dong et al. | |
| 2009/0180545 A1 | 7/2009 | Wu et al. | |
| 2009/0219993 A1* | 9/2009 | Bronstein et al. | 375/240.03 |
| 2009/0245351 A1* | 10/2009 | Watanabe | 375/240.03 |
| 2009/0257670 A1* | 10/2009 | Chiu et al. | 382/239 |
| 2009/0274215 A1* | 11/2009 | Metsugi | 375/240.16 |
| 2009/0285308 A1 | 11/2009 | Panchapakesan et al. | |
| 2009/0304085 A1* | 12/2009 | Avadhanam et al. | 375/240.24 |
| 2009/0304086 A1* | 12/2009 | Shi et al. | 375/240.24 |
| 2010/0021071 A1* | 1/2010 | Wittmann et al. | 382/232 |
| 2010/0027686 A1* | 2/2010 | Zuo et al. | 375/240.29 |
| 2010/0074328 A1* | 3/2010 | Zuo et al. | 375/240.03 |
| 2010/0074332 A1* | 3/2010 | Karczewicz et al. | 375/240.12 |
| 2010/0118982 A1* | 5/2010 | Chatterjee et al. | 375/240.29 |
| 2010/0128778 A1* | 5/2010 | Ji et al. | 375/240.2 |
| 2010/0137166 A1* | 6/2010 | Kain et al. | 506/39 |
| 2010/0138162 A1* | 6/2010 | Kain et al. | 702/19 |
| 2010/0208806 A1 | 8/2010 | Yu et al. | |
| 2010/0239015 A1* | 9/2010 | Wang et al. | 375/240.16 |
| 2010/0245672 A1* | 9/2010 | Erdler et al. | 348/608 |
| 2010/0254448 A1* | 10/2010 | Xu et al. | 375/240.02 |
| 2010/0260264 A1* | 10/2010 | Sun et al. | 375/240.16 |
| 2011/0007801 A1* | 1/2011 | Andersson et al. | 375/240.14 |
| 2011/0051812 A1* | 3/2011 | Tanaka et al. | 375/240.12 |
| 2011/0051864 A1* | 3/2011 | Chalia et al. | 375/346 |
| 2011/0110427 A1* | 5/2011 | Teng et al. | 375/240.16 |
| 2011/0116549 A1* | 5/2011 | Sun | 375/240.16 |
| 2011/0188574 A1 | 8/2011 | Matsuo et al. | |
| 2011/0249739 A1* | 10/2011 | Liu et al. | 375/240.12 |
| 2011/0262013 A1* | 10/2011 | Rahmes et al. | 382/125 |
| 2011/0293019 A1* | 12/2011 | Steinberg et al. | 375/240.25 |
| 2011/0302463 A1* | 12/2011 | Kallman | 714/699 |
| 2011/0312275 A1* | 12/2011 | Canpolat et al. | 455/63.1 |
| 2012/0008687 A1* | 1/2012 | Haskell | 375/240.16 |
| 2012/0082236 A1* | 4/2012 | Haskell | 375/240.24 |
| 2012/0084042 A1* | 4/2012 | Yuan | 702/116 |
| 2012/0189067 A1* | 7/2012 | Dang | 375/240.29 |
| 2012/0219059 A1* | 8/2012 | Chiu et al. | 375/240.03 |

FOREIGN PATENT DOCUMENTS

| | | |
|---|---|---|
| JP | H11-127288 A | 5/1999 |
| JP | 2000-244909 A | 9/2000 |
| JP | 2003-235041 A | 8/2003 |
| JP | 2006-099404 A | 4/2006 |
| JP | 2006-115168 A | 4/2006 |
| WO | 03/029989 A1 | 4/2003 |
| WO | 2005-002233 A1 | 1/2005 |
| WO | 2005084035 A2 | 9/2005 |
| WO | 2006-080261 A2 | 8/2006 |
| WO | 2007-081106 A1 | 7/2007 |
| WO | 2007109186 A2 | 9/2007 |
| WO | 2008-011502 A2 | 1/2008 |
| WO | 2008-033830 A2 | 3/2008 |
| WO | 2010/047104 A1 | 4/2010 |

OTHER PUBLICATIONS

Wang et al., "Boundary-energy sensitive visual de-blocking for H.264/AVC coder," Proceedings of SPIE, vol. 5558, 2004, pp. 512-523 (XP040191188).

Li et al., "Memetic Gradient Search," Evolutionary Computation, 2008 IEEE Congress on Evolutionary Computation, pp. 2894-2901, Jun. 1, 2008.

Nocedal and Wright, "Numerical Optimization," Springer Series in Operations Research, pp. 1-9, 35-36, 165-167 (1999) (XP002682761).

List et al., "Adaptive Deblocking Fliter," IEEE Transactions on Circuits and Systems for Video Technology, (13)7: 614-619, Jul. 1, 2003.

Bronstein et al., "Numerical Optimization (42 Slides)", VIPS Advanced School on Numerical Geometry of Non-Rigid Shapes, University of Verona, Apr. 2010, pp. 1-8, XP002682762, Retrieved from Internet on Sep. 4, 2012: URL: http://www.toldo.info/vipsschool/slides/VIPS2010_optimization.pdf.

Haskell et al., Digital Video: an Introduction to MPEG-2—Chapter 1: Introduction to Digital Multimedia, Compression and MPEG-2, pp. 1-13, Chapman & Hall, New York, 1997.

Haskell et al., Digital Video: an Introduction to MPEG-2—Chapter 2: Anatomy of MPEG-2, pp. 14-31, Chapman & Hall, New York, 1997.

Haskell et al., Digital Video: an Introduction to MPEG-2—Chapter 3: MPEG-2 Systems, pp. 32-54, Chapman & Hall, New York, 1997.

Haskell et al., Digital Video: an Introduction to MPEG-2—Chapter 4: Audio, pp. 55-79, Chapman & Hall, New York, 1997.

Haskell et al., Digital Video: an Introduction to MPEG-2—Chapter 5: Video Basics, pp. 80-109, Chapman & Hall, New York, 1997.

Haskell et al., Digital Video: an Introduction to MPEG-2—Chapter 6: Digital Compression: Fundamentals, pp. 110-145, Chapman & Hall, New York, 1997.

Haskell et al., Digital Video: an Introduction to MPEG-2—Chapter 7: Motion Compensation Modes in MPEG, pp. 146-155, Chapman & Hall, New York, 1997.

Haskell et al., Digital Video: an Introduction to MPEG-2—Chapter 8: MPEG-2 Video Coding and Compression, pp. 156-182, Chapman & Hall, New York, 1997.

Haskell et al., Digital Video: an Introduction to MPEG-2—Chapter 9: MPEG-2 Scalability Techniques, pp. 183-229, Chapman & Hall, New York, 1997.

Haskell et al., Digital Video: an Introduction to MPEG-2—Chapter 10: Video Stream Syntax and Semantics, pp. 230-257, Chapman & Hall, New York, 1997.

Haskell et al., Digital Video: an Introduction to MPEG-2—Chapter 11: Requirements and Profiles, pp. 258-279, Chapman & Hall, New York, 1997.

Haskell et al., Digital Video: an Introduction to MPEG-2—Chapter 12: Digital Networks, pp. 280-291, Chapman & Hall, New York, 1997.

Haskell et al., Digital Video: an Introduction to MPEG-2—Chapter 13: Interactive Television, pp. 292-306, Chapman & Hall, New York, 1997.

Haskell et al., Digital Video: an Introduction to MPEG-2—Chapter 14: High Definition Television (HDTV), pp. 307-321, Chapman & Hall, New York, 1997.

Haskell et al., Digital Video: an Introduction to MPEG-2—Chapter 15: Three-Dimensional TV, pp. 322-359, Chapman & Hall, New York, 1997.

Haskell et al., Digital Video: an Introduction to MPEG-2—Chapter 16: Processing Architecture and Implementation Dr. Horng-Dar Lin, pp. 361-368, Chapman & Hall, New York, 1997.

Haskell et al., Digital Video: an Introduction to MPEG-2—Chapter 17: MPEG-4 and the Future, pp. 369-411, Chapman & Hall, New York, 1997.

(56) References Cited

OTHER PUBLICATIONS

Haskell et al., Digital Video: an Introduction to MPEG-2—Table of Contents, Chapman & Hall, New York, 1997.
Chujoh et al., "Block-based Adaptive Loop Filter," ITU—Telecommunications Standardization Sector, Video Coding Experts Group (VCEG), 35$^{th}$ Meeting: Berlin, Germany, Jul. 2008 (VCEG-AI18).
Haskell et al., "Quality Metrics for Coded Video Using JND Models," ITU—Telecommunications Standardization Sector, Video Coding Experts Group (VCEG), 36$^{th}$ Meeting: San Diego, USA, Oct. 2008 (VCEG-AJ22).
Chujoh et al., "Specification and experimental results of Quadtree-based Adaptive Loop Filter," ITU—Telecommunications Standardization Sector, Video Coding Experts Group (VCEG), 37$^{th}$ Meeting: Yokohama, Japan, Apr. 2009 (VCEG-AK22).
Chono et al., "Description of video coding technology proposal by NEC Corporation," Joint Collaborative Team on Video Coding (JCT-VC) of ITU-T SG16 WP3 and ISO/IEC JTC1/SC29/WG11, 1$^{st}$ Meeting: Dresden, Germany, Apr. 2010 (JCTVC-A104).
Chiu et al., "Description of video coding technology proposal: self derivation of motion estimation and adaptive (Wiener) loop filtering," Joint Collaborative Team on Video Coding (JCT-VC) of ITU-T SG16 WP3 and ISO/IEC JTC1/SC29/WG11, 1$^{st}$ Meeting: Dresden, Germany, Apr. 2010 (JCTVC-A106).
Huang et al., "A Technical Description of MediaTek's Proposal to the JCT-VC CfP," Joint Collaborative Team on Video Coding (JCT-VC) of ITU-T SG16 WP3 and ISO/IEC JTC1/SC29/WG11, 1$^{st}$ Meeting: Dresden, Germany, Apr. 2010 (JCTVC-A109_r2).
Amonou et al., "Description of video coding technology proposal by France Telecom, NTT, NT DOCOMO, Panasonic and Technicolor," Joint Collaborative Team on Video Coding (JCT-VC) of ITU-T SG16 WP3 and ISO/IEC JTC1/SC29/WG11, 1$^{st}$ Meeting: Dresden, Germany, Apr. 2010 (JCTVC-A114).
"Generic Coding of Moving Pictures and Associated Audio Information Video", International Organization for Standardisation Information Technology Recommendation H.262, ISO/IEC 13818-2 JTC1/SC29/WG11 N0702 (revised), incorporating N702 Delta of March 24 and further editorial corrections; May 10, 1994, 17 pages.
International Organization for Standardisation, "Coding of Moving Pictures and Associated Audio Information", MPEG-4 Video Verification Model Version 2.1, Ad-hoc Group of MPEG-4 Video VM Editing; ISO/IEC JTC1/SC29/WG11 XXXX of May 3, 1996, pp. 1-69.
International Organization for Standardization; "Coding of Moving Pictures and Audio", ISO/IEC JTC1/SC29/WG11-N1350; MPEG96, Source: Leonardo Chiariglione—Convenor, Tampere Press Release, Approved at 35th WG11 Meeting, Jul. 1996, pp. 1-4.
Ramanujan, R S, et al., "Adaptive Streaming of MPEG Video Over IP Networks", Architectural Technology Corporation, Minneapolis, MN, Defense Advanced Research Projects Agency (DARPA) under contract No. DAAH01-96-C-R048, Nov. 2, 1997, pp. 398-409.
Warsaw et al., Architectures Design of an H.264/AVC Decorder for RESL-Time FPGA Implementation, Application-specific Systems, Architectures and Processors, (ASAP '06), 0-7695-2682—Sep. 2006, IEEE, 4 pages.
Hu et al., "Decoder-Friendly Adaptive Deblocking Filter (DF-ADF) Mode Decision in H.264/AVC," 1-4244-0971—Jul. 2007, IEEE, pp. 3976-3979.
English translation of Search Report from corresponding Taiwanese Patent Application No. 100128608, filed Aug. 10, 2011.

\* cited by examiner

ENCODER
110

100

DECODER
120

200

300

600

900

OPTIMIZED DEBLOCKING FILTERS

BACKGROUND

The present invention relates to video coding and, more particularly, to video coding system using interpolation filters as part of motion-compensated coding.

Video codecs typically code video frames using a discrete cosine transform ("DCT") on blocks of pixels, called "pixel blocks" herein, much the same as used for the original JPEG coder for still images. An initial frame (called an "intra" frame) is coded and transmitted as an independent frame. Subsequent frames, which are modeled as changing slowly due to small motions of objects in the scene, are coded efficiently in the inter mode using a technique called motion compensation ("MC") in which the displacement of pixel blocks from their position in previously-coded frames are transmitted as motion vectors together with a coded representation of a difference between a predicted pixel block and a pixel block from the source image.

A brief review of motion compensation is provided below. FIGS. 1 and 2 show block diagrams of a motion-compensated image coder/decoder system. The system combines transform coding (in the form of the DCT of pixel blocks of pixels) with predictive coding (in the form of differential pulse coded modulation ("PCM")) in order to reduce storage and computation of the compressed image, and at the same time to give a high degree of compression and adaptability. Since motion compensation is difficult to perform in the transform domain, the first step in the interframe coder is to create a motion compensated prediction error. This computation requires one or more frame stores in both the encoder and decoder. The resulting error signal is transformed using a DCT, quantized by an adaptive quantizer, entropy encoded using a variable length coder ("VLC") and buffered for transmission over a channel.

Motion estimator works as illustrated in FIG. 3. In its simplest form the current frame is partitioned into motion compensation blocks, called "mcblocks" herein, of constant size, e.g., 16×16 or 8×8. However, variable size mcblocks are often used, especially in newer codecs such as H.264. ITU-T Recommendation H.264, Advanced Video Coding. Indeed nonrectangular mcblocks have also been studied and proposed. Mcblocks are generally larger than or equal to pixel blocks in size.

Again, in the simplest form of motion compensation, the previous decoded frame is used as the reference frame, as shown in FIG. 3. However, one of many possible reference frames may also be used, especially in newer codecs such as H.264. In fact, with appropriate signaling, a different reference frame may be used for each mcblock.

Each mcblock in the current frame is compared with a set of displaced mcblocks in the reference frame to determine which one best predicts the current mcblock. When the best matching mcblock is found, a motion vector is determined that specifies the displacement of the reference mcblock.

Exploiting Spatial Redundancy

Because video is a sequence of still images, it is possible to achieve some compression using techniques similar to JPEG. Such methods of compression are called intraframe coding techniques, where each frame of video is individually and independently compressed or encoded. Intraframe coding exploits the spatial redundancy that exists between adjacent pixels of a frame. Frames coded using only intraframe coding are called "I-frames".

Exploiting Temporal Redundancy

In the unidirectional motion estimation described above, called "forward prediction", a target mcblock in the frame to be encoded is matched with a set of mcblocks of the same size in a past frame called the "reference frame". The mcblock in the reference frame that "best matches" the target mcblock is used as the reference mcblock. The prediction error is then computed as the difference between the target mcblock and the reference mcblock. Prediction mcblocks do not, in general, align with coded mcblock boundaries in the reference frame. The position of this best-matching reference mcblock is indicated by a motion vector that describes the displacement between it and the target mcblock. The motion vector information is also encoded and transmitted along with the prediction error. Frames coded using forward prediction are called "P-frames".

The prediction error itself is transmitted using the DCT-based intraframe encoding technique summarized above.

Bidirectional Temporal Prediction

Bidirectional temporal prediction, also called "Motion-Compensated Interpolation", is a key feature of modern video codecs. Frames coded with bidirectional prediction use two reference frames, typically one in the past and one in the future. However, two of many possible reference frames may also be used, especially in newer codecs such as H.264. In fact, with appropriate signaling, different reference frames may be used for each mcblock.

A target mcblock in bidirectionally-coded frames can be predicted by a mcblock from the past reference frame (forward prediction), or one from the future reference frame (backward prediction), or by an average of two mcblocks, one from each reference frame (interpolation). In every case, a prediction mcblock from a reference frame is associated with a motion vector, so that up to two motion vectors per mcblock may be used with bidirectional prediction. Motion-Compensated Interpolation for a mcblock in a bidirectionally-predicted frame is illustrated in FIG. 4. Frames coded using bidirectional prediction are called "B-frames".

Bidirectional prediction provides a number of advantages. The primary one is that the compression obtained is typically higher than can be obtained from forward (unidirectional) prediction alone. To obtain the same picture quality, bidirectionally-predicted frames can be encoded with fewer bits than frames using only forward prediction.

However, bidirectional prediction does introduce extra delay in the encoding process, because frames must be encoded out of sequence. Further, it entails extra encoding complexity because mcblock matching (the most computationally intensive encoding procedure) has to be performed twice for each target mcblock, once with the past reference frame and once with the future reference frame.

Typical Encoder Architecture for Bidirectional Prediction

FIG. 5 shows a typical bidirectional video encoder. It is assumed that frame reordering takes place before coding, i.e., I- or P-frames used for B-frame prediction must be coded and transmitted before any of the corresponding B-frames. In this codec, B-frames are not used as reference frames. With a change of architecture, they could be as in H.264.

Input video is fed to a Motion Compensation Estimator/Predictor that feeds a prediction to the minus input of the subtractor. For each mcblock, the Inter/Intra Classifier then compares the input pixels with the prediction error output of the subtractor. Typically, if the mean square prediction error exceeds the mean square pixel value, an intra mcblock is decided. More complicated comparisons involving DCT of both the pixels and the prediction error yield somewhat better performance, but are not usually deemed worth the cost.

For intra mcblocks the prediction is set to zero. Otherwise, it comes from the Predictor, as described above. The prediction error is then passed through the DCT and quantizer before being coded, multiplexed and sent to the Buffer.

Quantized levels are converted to reconstructed DCT coefficients by the Inverse Quantizer and then the inverse is transformed by the inverse DCT unit ("IDCT") to produce a coded prediction error. The Adder adds the prediction to the prediction error and clips the result, e.g., to the range 0 to 255, to produce coded pixel values.

For B-frames, the Motion Compensation Estimator/Predictor uses both the previous frame and the future frame kept in picture stores.

For I- and P-frames, the coded pixels output by the Adder are written to the Next Picture Store, while at the same time the old pixels are copied from the Next Picture Store to the Previous Picture Store. In practice, this is usually accomplished by a simple change of memory addresses.

Also, in practice the coded pixels may be filtered by an adaptive deblocking filter prior to entering the picture stores. This improves the motion compensation prediction, especially for low bit rates where coding artifacts may become visible.

The Coding Statistics Processor in conjunction with the Quantizer Adapter controls the output bitrate and optimizes the picture quality as much as possible.

Typical Decoder Architecture for Bidirectional Prediction

FIG. 6 shows a typical bidirectional video decoder. It has a structure corresponding to the pixel reconstruction portion of the encoder using inverting processes. It is assumed that frame reordering takes place after decoding and video output. The interpolation filter might be placed at the output of the motion compensated predictor as in the encoder.

Fractional Motion Vector Displacements

FIG. 3 and FIG. 4 show reference mcblocks in reference frames as being displaced vertically and horizontally with respect to the position of the current mcblock being decoded in the current frame. The amount of the displacement is represented by a two-dimensional vector [dx, dy], called the motion vector. Motion vectors may be coded and transmitted, or they may be estimated from information already in the decoder, in which case they are not transmitted. For bidirectional prediction, each transmitted mcblock requires two motion vectors.

In its simplest form, dx and dy are signed integers representing the number of pixels horizontally and the number of lines vertically to displace the reference mcblock. In this case, reference mcblocks are obtained merely by reading the appropriate pixels from the reference stores.

However, in newer video codecs it has been found beneficial to allow fractional values for dx and dy. Typically, they allow displacement accuracy down to a quarter pixel, i.e., an integer+−0.25, 0.5 or 0.75.

Fractional motion vectors require more than simply reading pixels from reference stores. In order to obtain reference mcblock values for locations between the reference store pixels, it is necessary to interpolate between them.

Simple bilinear interpolation can work fairly well. However, in practice it has been found beneficial to use two-dimensional interpolation filters especially designed for this purpose. In fact, for reasons of performance and practicality, the filters are often not shift-invariant filters. Instead, different values of fractional motion vectors may utilize different interpolation filters.

Motion Compensation Using Adaptive Interpolation Filters

The optimum motion compensation interpolation filter depends on a number of factors. For example, objects in a scene may not be moving in pure translation. There may be object rotation, both in two dimensions and three dimensions. Other factors include zooming, camera motion and lighting variations caused by shadows, or varying illumination.

Camera characteristics may vary due to special properties of their sensors. For example, many consumer cameras are intrinsically interlaced, and their output may be de-interlaced and filtered to provide pleasing-looking pictures free of interlacing artifacts. Low light conditions may cause an increased exposure time per frame, leading to motion dependent blur of moving objects. Pixels may be non-square.

Thus, in many cases improved performance can be had if the motion compensation interpolation filter can adapt to these and other outside factors. In such systems interpolation filters may be designed by minimizing the mean square error between the current mcblocks and their corresponding reference mcblocks over each frame. These are the so-called Wiener filters. The filter coefficients would then be quantized and transmitted at the beginning of each frame to be used in the actual motion compensated coding. In H.264 and similar codecs, only a few deblocking parameters are allowed to be adjusted periodically. Moreover, since the filter operations are so nonlinear, ordinary Wiener filter design cannot be applied.

Accordingly, there is a need in the art for an efficient scheme for selecting parameters of deblocking filters during coding.

DETAILED DESCRIPTION

Embodiments of the present invention provide iterative methods for selecting deblocking parameters for coded video. According to the method, a decoded picture may be deblocked according to parameters associated with a multi-dimensional deblocking vector and an error, called the "deblocking error" may be estimated therefrom. If the estimated error exceeds a predetermined threshold, then alternate deblocking vectors may be created, each advanced from the current deblocking vector in a respective dimension. The method may deblock the decoded picture according to each advanced vector and may estimate errors from each of the deblocking of each advanced vector. Finally, the deblocking vector may be revised for a next iteration according to a gradient derived from the estimated deblocking errors of the vector dimensions. This gradient-based search method may converge on a final set of deblocking parameters in an efficient manner.

Figure 1:
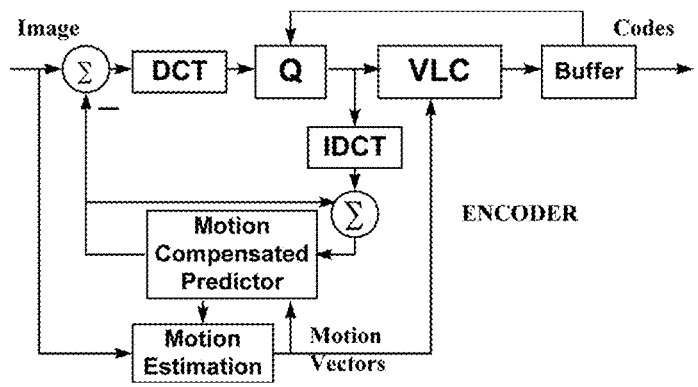
FIG. 1 is a block diagram of a conventional video coder.
Figure 2:
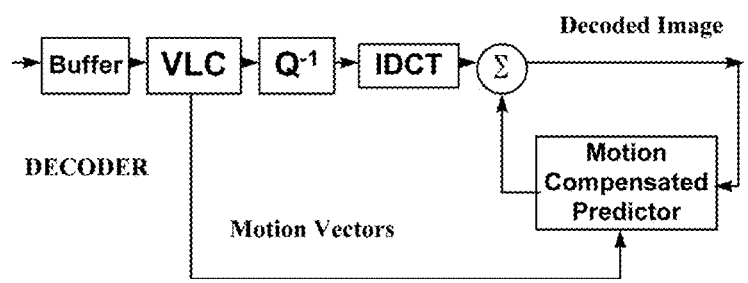
FIG. 2 is a block diagram of a conventional video decoder.
Figure 3:
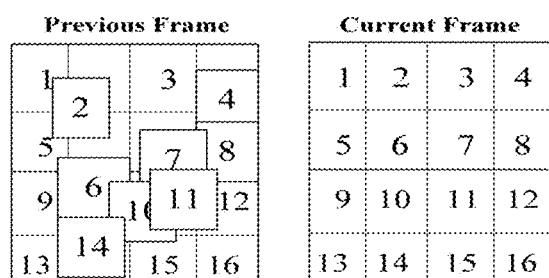
FIG. 3 illustrates principles of motion compensated prediction.
Figure 4:
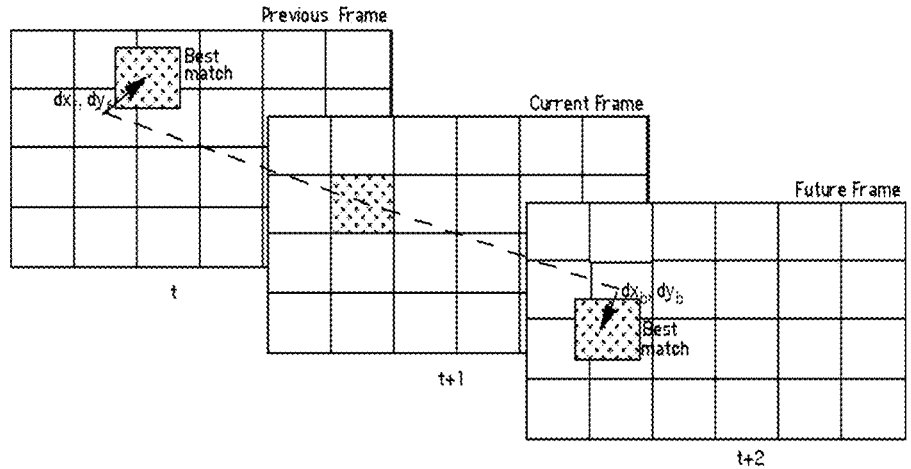
FIG. 4 illustrates principles of bidirectional temporal prediction.
Figure 5:
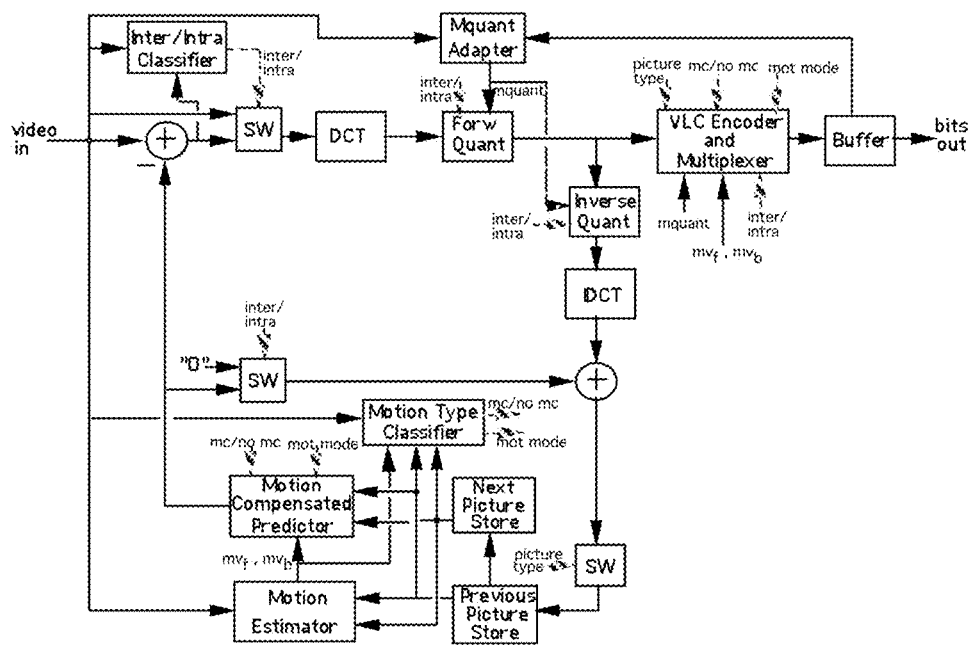
FIG. 5 is a block diagram of a conventional bidirectional video coder.
Figure 6:
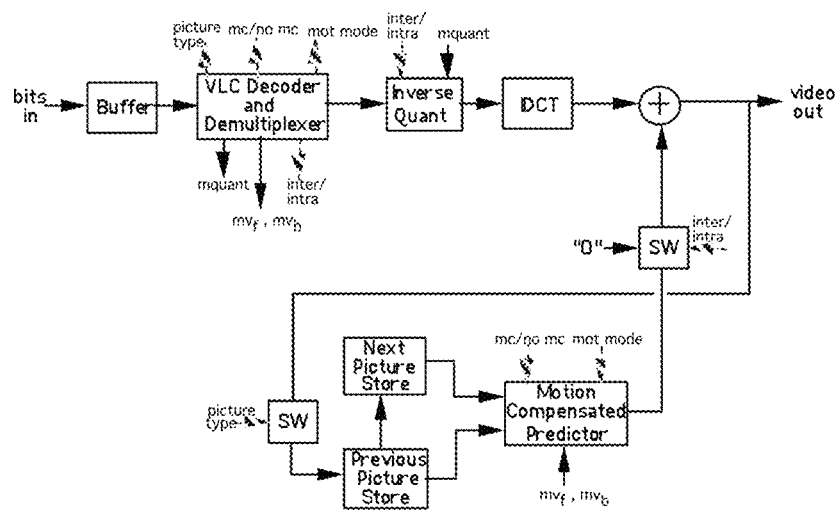
FIG. 6 is a block diagram of a conventional bidirectional video decoder.
Figure 7:
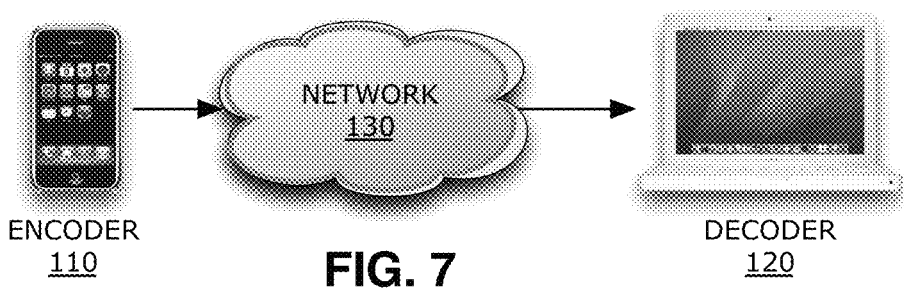
FIG. 7 illustrates an encoder/decoder system suitable for use with embodiments of the present invention.

FIG. 7 illustrates a coder/decoder system 100 suitable for use with the present invention. There, an encoder 110 is provided in communication with a decoder 120 via a network 130. The encoder 110 may perform coding operations on a data stream of source video, which may be captured locally at the encoder via a camera device or retrieved from a storage device (not shown). The coding operations reduce the bandwidth of the source video data, generating coded video therefrom. The encoder 110 may transmit the coded video to the decoder 120 over the network 130. The decoder 120 may invert coding operations performed by the encoder 110 to generate a recovered video data stream from the coded video data. Coding operations performed by the encoder 110 typically are lossy processes and, therefore, the recovered video data may be an inexact replica of the source video data. The decoder 120 may render the recovered video data on a display device or it may store the recovered video data for later use.

As illustrated, the network 130 may transfer coded video data from the encoder 110 to the decoder 120. The network 130 may be provided as any number of wired or wireless communications networks, computer networks or a combination thereof. Further, the network 130 may be provided as a storage unit, such as an electrical, optical or magnetic storage device.

Figure 8:
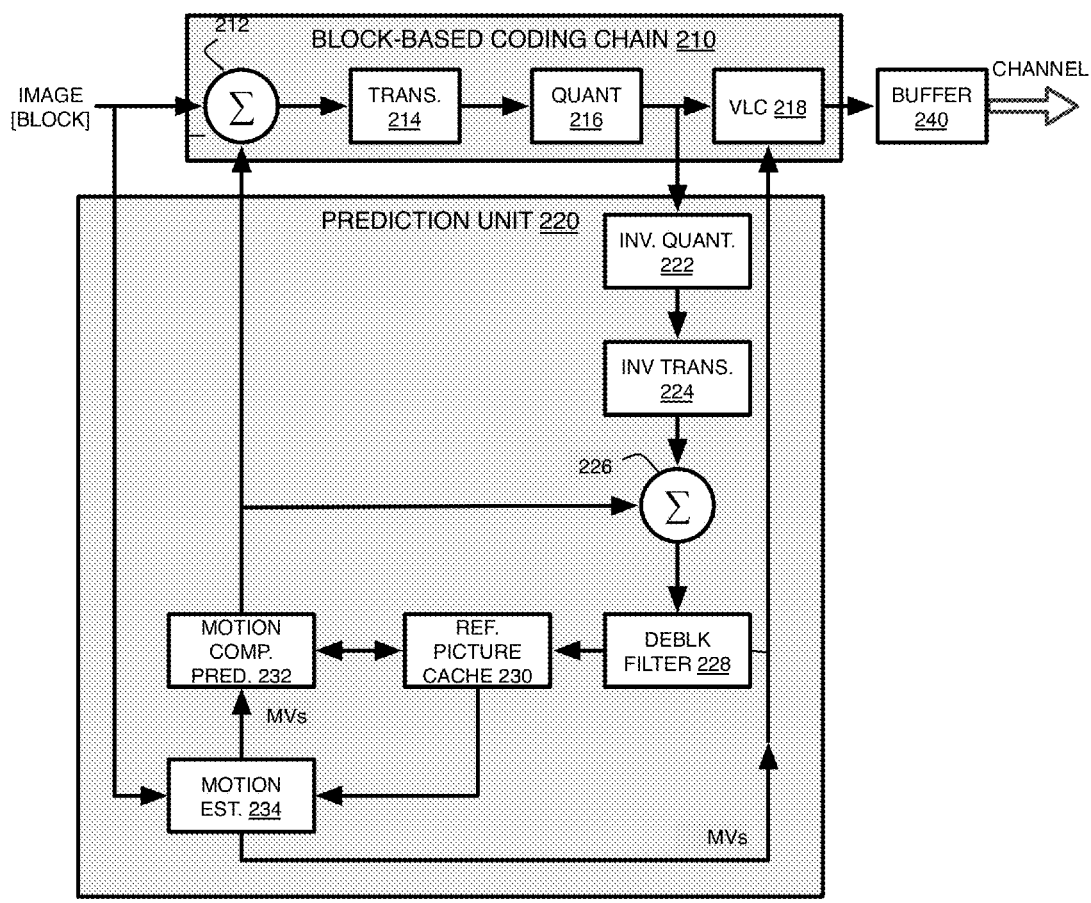
FIG. 8 is a simplified block diagram of a video encoder according to an embodiment of the present invention.

FIG. 8 is a simplified block diagram of an encoder suitable for use with the present invention. The encoder 200 may include a block-based coding chain 210 and a prediction unit 220.

The block-based coding chain 210 may include a subtractor 212, a transform unit 214, a quantizer 216 and a variable length coder 218. The subtractor 212 may receive an input mcblock from a source image and a predicted mcblock from the prediction unit 220. It may subtract the predicted mcblock from the input mcblock, generating a block of pixel residuals. The transform unit 214 may convert the mcblock's residual data to an array of transform coefficient according to a spatial transform, typically a discrete cosine transform ("DCT") or a wavelet transform. The quantizer 216 may truncate transform coefficients of each block according to a quantization parameter ("QP"). The QP values used for truncation may be transmitted to a decoder in a channel. The variable length coder 218 may code the quantized coefficients according to an entropy coding algorithm, for example, a variable length coding algorithm. Following variable length coding, the coded data of each mcblock may be stored in a buffer 240 to await transmission to a decoder via a channel.

The prediction unit 220 may include: an inverse quantization unit 222, an inverse transform unit 224, an adder 226, a deblocking filter 228, a reference picture cache 230, a motion compensated predictor 232 and a motion estimator 234. The inverse quantization unit 222 may quantize coded video data according to the QP used by the quantizer 216. The inverse transform unit 224 may transform re-quantized coefficients to the pixel domain. The adder 226 may add pixel residuals output from the inverse transform unit 224 with predicted motion data from the motion compensated predictor 232. The deblocking filter 228 may filter recovered image data at seams between the recovered mcblock and other recovered mcblocks of the same frame. The reference picture cache 230 may store recovered frames for use as reference frames during coding of later-received mcblocks.

The motion compensated predictor 232 may generate a predicted mcblock for use by the block coder 210. The motion estimator 234 may estimate image motion between a source image being coded and reference frame(s) stored in the reference picture cache 230. It may select a prediction mode to be used (for example, unidirectional P-coding or bidirectional B-coding), and generate motion vectors for use in such predictive coding. The motion vectors may be output to the motion compensated predictor 232 and to the channel. In response, the motion compensated predictor 232 may retrieve a predicted mcblock from the reference picture cache 230 and may output the predicted block to the block coder 210. Optionally, the motion compensated predictor 232 may perform interpolation filtering upon the retrieved mcblock prior to outputting it to the block coder 210 (not shown).

Operation of the deblocking filter 228 may vary based on control parameters. At the encoder, control logic (not shown) may review coded image data generated by the prediction unit and may compare the coded image data to data of the source images to determine which parameters minimize coding errors. In an embodiment, the selection process may be augmented by a gradient search process through candidate parameter values to converge quickly on an appropriate set of parameters. Once the appropriate parameters are selected, parameter identifiers may be transmitted to a decoder for use in decoding. For example, deblocking parameters may be transmitted for each mcblock in the picture or for larger entities (for example, macroblocks or slices). The deblocking parameters may be transmitted with other data of the coded mcblocks (e.g., motion vectors, quantization parameters and coded residuals).

Figure 9:
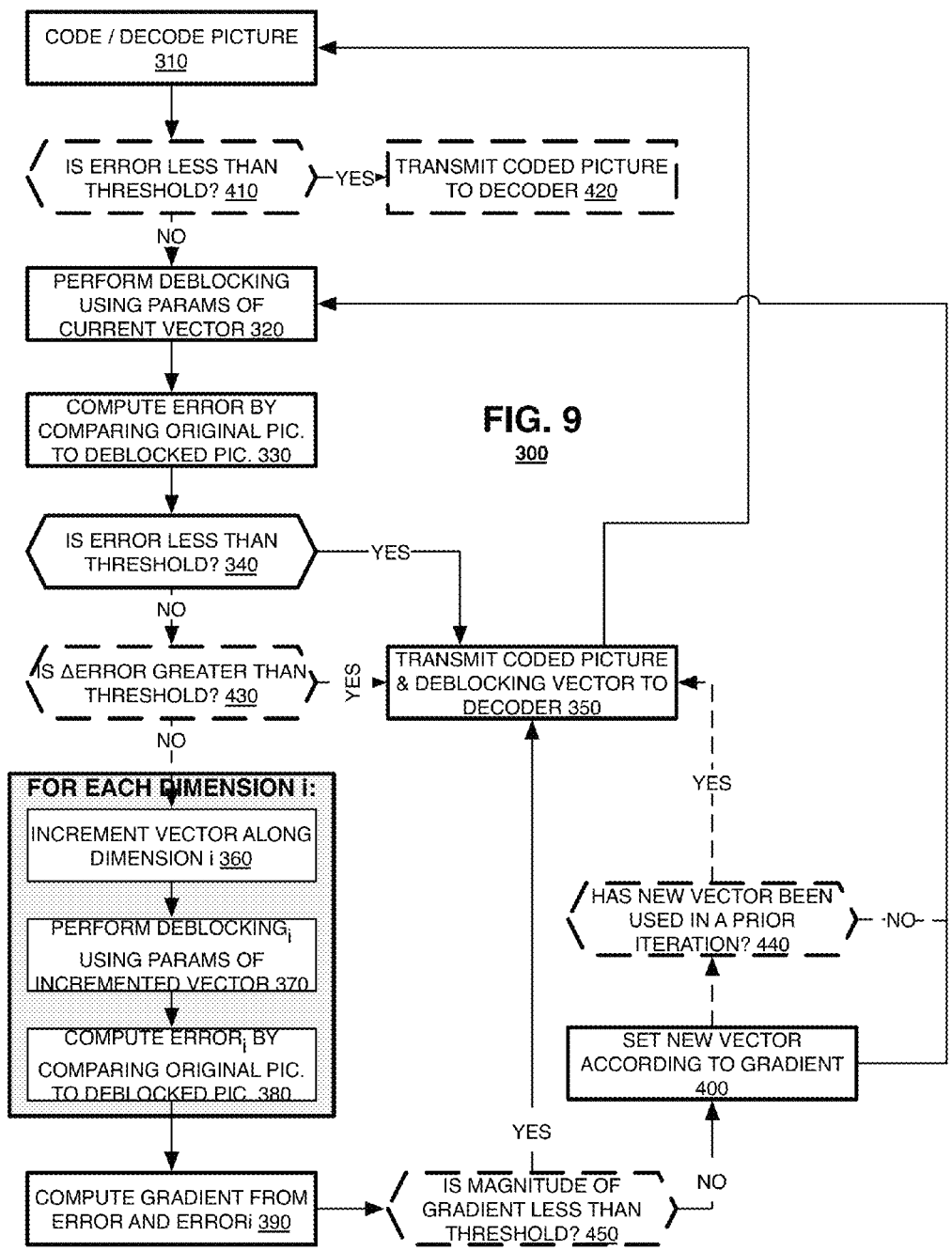
FIG. 9 illustrates a method according to an embodiment of the present invention.

FIG. 9 illustrates a method 300 according to an embodiment of the present invention. The method 300 may begin by coding and decoding a source picture (box 310), then performing deblocking upon the picture using deblocking parameters associated with a current deblocking vector (box 320). In a first iteration of the method 300, the vector may be set to a default value. The method 300 may compute an error associated with the deblocked picture (box 330) and compare the error to a predetermined threshold (box 340). If the error is less than a predetermined threshold, the method 300 may transmit coded picture data and the current deblocking vector to a decoder (box 350) and the method 300 may terminate for the current picture.

The deblocking parameters may be considered to represent an N-dimensional vector having multiple values. For example, H.264 defines two parameters that can be defined by an encoder in image coding: slice_alpha_c0_offset_div 2 and slice_beta_offset_div 2 (called "α" and "β" herein). As applied to an H.264 implementation, the deblocking parameters may be considered a two-dimensional vector. Future coding protocols may define additional types of deblocking parameters, which may be represented as 3, 4 or larger dimensional spaces when considered in context of the method 300 of FIG. 9.

When the comparison of box 340 determines that the error exceeds the threshold, the method 300 may perform a multi-dimensional search for a new deblocking vector. Specifically, the method 300 may increment the current vector separately in each dimension i (box 360). The method 300 may perform deblocking of the decoded picture using parameters associated with each of the incremented vectors (box 370) and compute an error between the original picture and the deblocked picture (box 380). In an N-dimensional vector space, there may be N deblocked pictures and N error values obtained therefrom. The method 300 may compute a gradient value by comparing the error value obtained at box 330 to the errors obtained from each dimensional calculation in box 380 (box 390). The method 300 may generate a new vector from the gradient (box 400) and perform another iteration of analysis, returning to box 320.

The gradient vector may be an N-dimensional vector where the component of each dimension i may be obtained by a comparison of the deblocking error from box 330 to the dimensional error obtained from box 380. For example, the gradient vector G may be computed as:

$$G=[G_1,G_2,\ldots,G_N], \text{where } G_i=err_i-err_{DBLK}$$

for each component $G_i$ of the gradient vector.

The method 300 further may generate a new deblocking vector V as:

$$V_{new} = V_{old} - \frac{w*G}{|G|},$$

where w represents a step size of the algorithm and each dimensional component $V_i$ is rounded to have integer values. The step size w is a programmable value that, typically, is set based on the size of the deblocking vector space in each dimension.

As applied to an H.264 implementation, for example, the method 300 may generate a gradient vector G as G=[$err_\alpha$-$err_{DBLK}$, $err_\beta$-$err_{DBLK}$], where $err_\alpha$ and $err_\beta$ are error values obtained by box 380 in the $\alpha$ and $\beta$ dimensions respectively. The method 300 further may generate a new deblocking vector $[\alpha,\beta]_{new}$ as:

$$[\alpha, \beta]_{new} = [\alpha, \beta]_{old} - \frac{w*G}{|G|},$$

where again, $[\alpha,\beta]_{new}$ is rounded to have integer values. In practice, a value of w=1.4 may give satisfactory results.

It is expected that, during operation, the gradient search method 300 of FIG. 9 may converge upon a set of deblocking parameters that generate an error lower than the threshold (box 340) through several iterations. Other embodiments of the method 300 accommodate other tests to terminate operation before an acceptably low error situation has been achieved.

For example, after the coded picture has been decoded (box 310), the method 300 may compute a decoding error and compare it to another threshold (box 410). If the decoding error is less than a threshold, the method 300 may cause the coded picture to be transmitted to a decoder without deblocking parameters (box 420). Such a test advantageously determines that deblocking is unnecessary to achieve appropriate image quality and, therefore, the processing resources required to perform the operations of boxes 320-400 may be conserved.

In another embodiment, if the error determined at box 340 is greater than the threshold, the method 300 further may determine a change in error between the current iteration and a prior iteration (shown as "Δerror"). When a first iteration is being executed, it is permissible to derive Δerror from the current error value and the decoding error value obtained at box 410. Alternatively, the first iteration may omit box 420. The method 300 may compare the Δerror value to another threshold (box 430). If the Δerror value exceeds a predetermined threshold, it may suggest that a rate of convergence of the gradient search method is unlikely to improve image enhancement sufficiently to warrant further execution of the method 300. In this case, the method 300 may advance to box 350 and transmit data of the coded picture and the deblocking vector to the decoder.

In a further embodiment, after the method 300 sets a new vector (box 400), the method 300 may determine whether the new vector has been used during some earlier iteration of the method (box 440). If so, it may indicate the further execution of the method 300 is unlikely to improve image enhancement beyond the results obtained through to the current iteration. In this case, the method 300 may advance to box 350 and transmit to the decoder data of the coded picture and the deblocking vector obtained prior to operation of box 400.

And, in yet another embodiment, the method 300 may terminate if a predetermined number of iterations of boxes 320-400 have been performed without generating a sufficiently low error to reach box 350.

In many implementations, the range of possible values of each deblocking parameter dimension will be finite. For example, in an H.264 implementation, α and β values each must be integers having a value between −6 and 6. In an embodiment, if the process of incrementing a vector in a particular dimension i (box 360) would cause the incremented value to go beyond a legal value (for example, α=7), then the incremented value should be set to the limit value (α=6) and the processing of boxes 370-380 associated with the respective dimension may be omitted. In that case, the error, value associated with the respective dimension may be estimated to equal the error value derived at box 330.

In a further embodiment, when the method 300 computes a gradient from the error values (box 390), the method 300 further may compute a ratio of the gradient's magnitude to the deblocking error obtained at box 330 and compare the ratio to another threshold (box 450). If the ratio is less than the threshold, the method 300 may advance to box 350 and transmit to the decoder data of the coded picture and the deblocking vector used at box 320.

During implementation, the threshold values used for comparison at boxes 340, 410 and 430-450 may be programmable values that can be tuned to suit individual needs. The thresholds may be set as static, pre-programmed values. Alternatively, they may vary dynamically during operation. For example, threshold values may vary based on a type of coding operation assigned to a respective picture (e.g., I-, P- or B-coding) or may vary based on a quantization parameter used to code the picture. The threshold values may vary based on a target bitrate budget that governed coding operations at the encoder. Moreover, the threshold values may vary based on data that describes a target decoder, for example, large screen devices (laptops, tablet computers) or small screen device (portable media players, smart phones) for which the video data is being coded.

Figure 10:
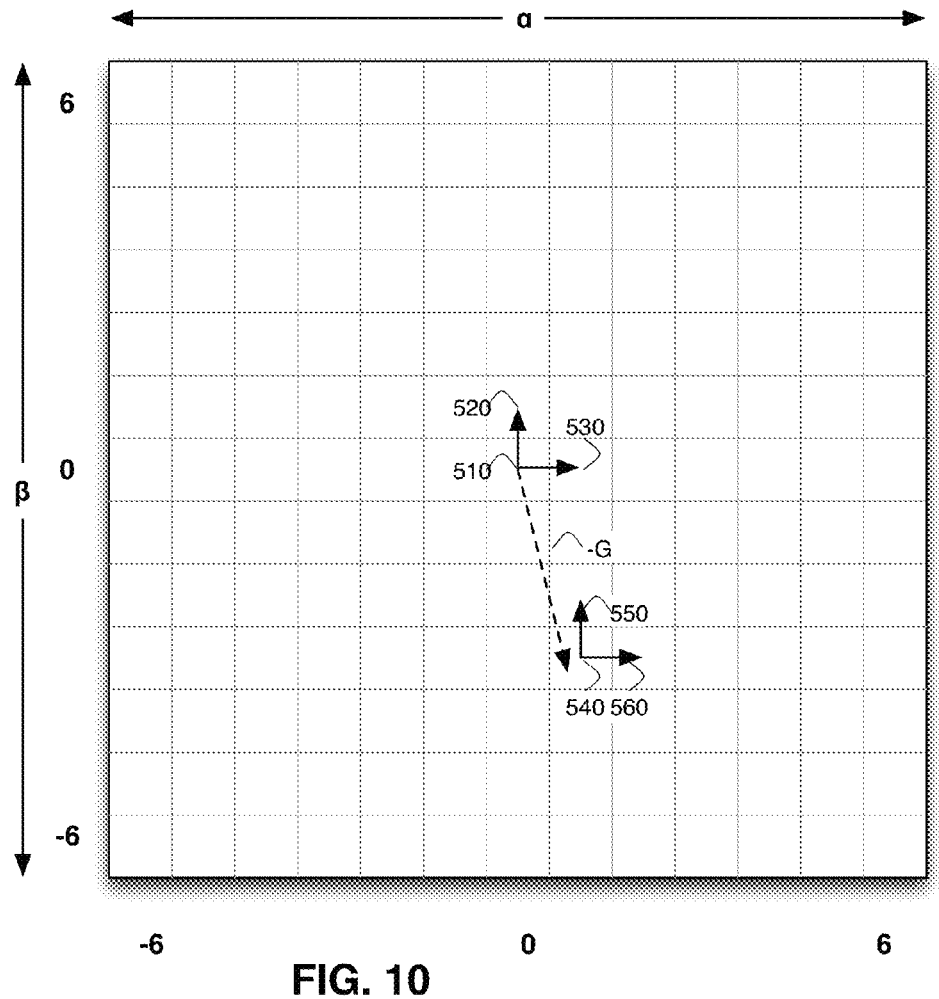
FIG. 10 illustrates exemplary operation of a gradient search method according to an embodiment of the present invention.

FIG. 10 illustrates operation of the gradient search method of FIG. 9 performed upon an exemplary deblocking matrix. As shown, the deblocking matrix is a two-dimensional 13×13 matrix that is indexed by values α, β. This example corresponds to the deblocking matrix that may be used in an H.264 implementation. Each cell location indexed by the α and β values is associated with a set of deblocking parameters that may be applied by a decoder. During operation, an encoder may transmit identifiers of α and β, which the decoder uses to retrieve deblocking filter parameters from a stored matrix.

In a first iteration of the method, deblocking vector 510 may be set to a default value, for example, [0,0]. A first deblocking operation may be performed using parameters associated with the deblocking vector 510. Assuming the error obtained therefrom is insufficient to terminate the method, the deblocking vector may be incremented in each dimension. In a two-dimensional vector space, this results in a pair of incremented vectors 520, 530. A pair of deblocking operations may be performed, each using parameters associated with a respective incremented vector 520, 530. A gradient vector G may be derived from error values associated with the pair of deblocking operations and the error value obtained from the original deblocking vector 510. Thereafter, another iteration may be performed using an updated deblocking vector 540 derived from the gradient vector G and, if the error obtained therefrom is insufficient to terminate operation of the method, another pair of incremented vectors 550, 560 may be computed. The operation may continue, generating new deblocking vectors, incremented deblocking vectors and gradient vectors (not shown) until a stopping point is reached.

Operation of the method of FIG. 9, in a two-dimensional case, may be performed by the following process flow:

```
Code current picture.
Decode current picture.
E0 ← MSE of the decoded undeblocked picture (current picture-decoded
  picture).
If E0 < t1:
  Transmit:
    compressed bits of picture and
    deblocking parameters (indicating no deblocking).
  Store decoded undeblocked picture in reference picture cache as
    reference in the motion compensated coding of future
    pictures.
  End process for current picture.
Else,
  Set deblocking parameter vector [A0, B0] = [*,*] to indicate no
    deblocking
  Set deblocking parameter vector [A1, B1] = [0, 0].
  Establish temporary stores TS0 and TS1 to hold pictures.
  TS0 ← decoded undeblocked picture.
PT.1: Deblock the decoded picture with parameters taken from vector
  [A1, B1]
  TS1 ← deblocked picture.
  Compute mean square error E1 between the original and deblocked
    picture.
  If E1 < te:
    Transmit:
      compressed bits of picture and
      deblocking parameters A1 and B1
    Store TS1 to reference picture cache.
    End process for current picture.
  Else, if E1/E0 > ti:
    Transmit:
      compressed bits of picture and
      deblocking parameters A0 and B0
    Store TS0 to reference picture cache.
    End process for current picture.
  If [A1+1, B1] = [A0, B0], set E2 ← E0.
  Else, set E2 ← E1.
  If [A1+1, B1] ≠ [A0, B0] and A1 < 6:
    Deblock decoded picture using parameters taken from vector
      [A1+1, B1]
    Compute mean square error E2 between the original and deblocked
      picture.
  If [A1, B1+1] = [A0, B0], set E3 ← E0.
  Else, set E3 ← E1.
  If [A1, B1+1] ≠ [A0, B0] and B1 < 6:
    Deblock decoded picture using parameters taken from vector
      [A1, B1+1]
    Compute mean square error E3 between the original and deblocked
      picture.
  Compute gradient vector G as G = [E2 − E1, E3 − E1].
```

```
  If |G|/E1 < ts:
    Transmit:
      compressed bits of picture and
      deblocking parameters A1 and B1
    Store TS1 to reference picture cache.
    End process for current picture.
  Else,
    set deblocking parameter vector [A0, B0] = [A1, B1]
    set E0 = E1 and
    set TS0 ← TS1
  Store [A1, B1] to history table.
  Compute new deblocking parameter vector [A1, B1] ← [A1, B1] − w ×
    G/|G|, where the new A1 and B1 are rounded to integers in the
    range [−6,6].
  If [A1, B1] matches history table:
    Transmit:
      compressed bits of picture and
      deblocking parameters A0 and B0
    Store TS0 to reference picture cache.
    End process for current picture.
  Else, perform next iteration, starting at PT. 1, with the new vector
    [A1, B1].
```

Figure 11:
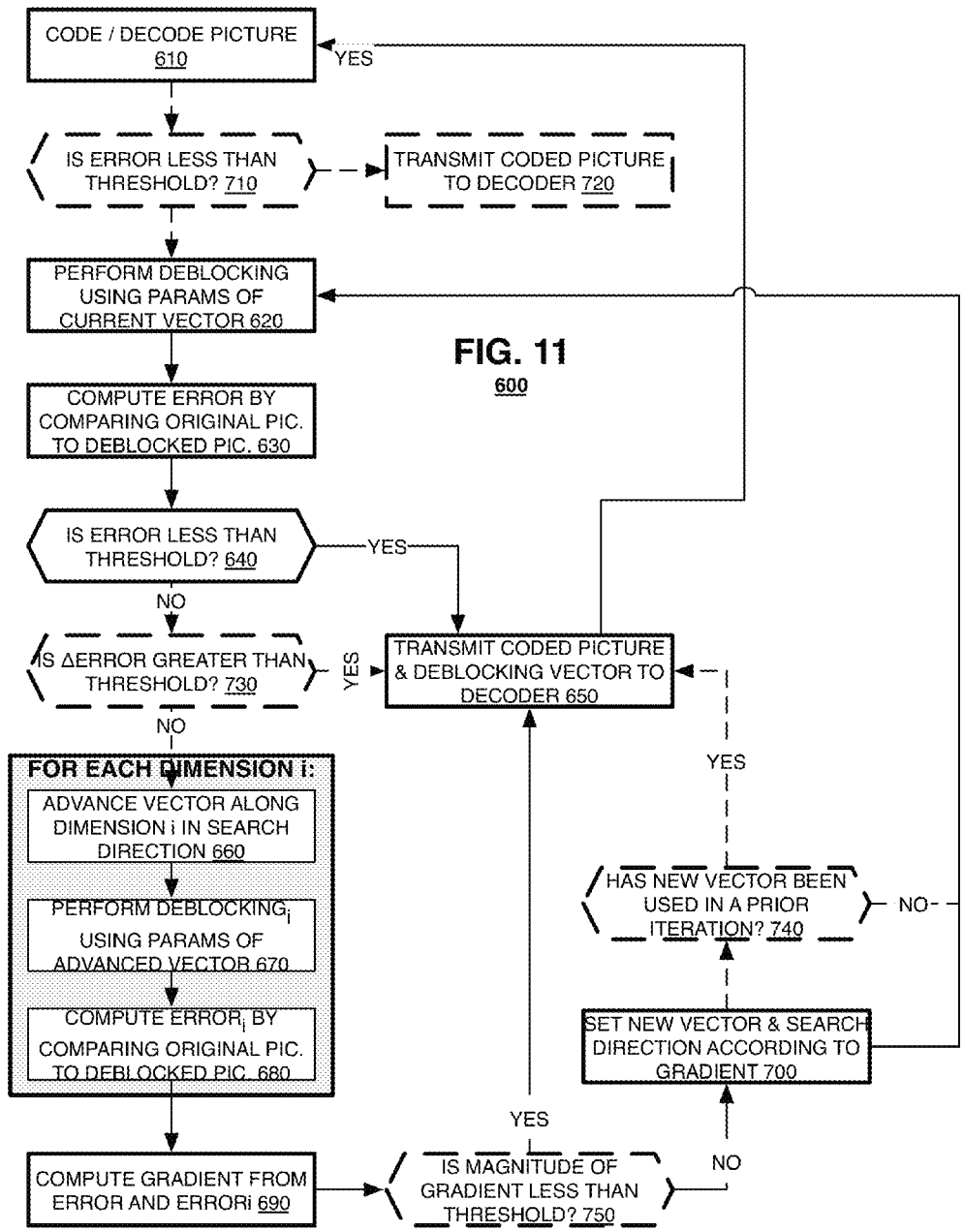
FIG. 11 illustrates a method according to another embodiment of the present invention.

FIG. 11 illustrates a method 600 according to an embodiment of the present invention. The method 600 may begin by coding and decoding a source picture (box 610), then performing deblocking upon the picture using a deblocking parameters associated with a current deblocking vector (box 620). In a first iteration of the method 600, the vector may be set to a default value. The method 600 may compute an error associated with the deblocked picture (box 630) and compare the error to a predetermined threshold (box 640). If the error is less than a predetermined threshold, the method 600 may transmit coded picture data and the current deblocking vector to a decoder (box 650) and the method 600 may terminate for the current picture.

The deblocking vector may be considered to represent an N-dimensional vector having multiple values. As in the FIG. 9 embodiment, when applied to an H.264 implementation, the α and β parameters may be considered a two-dimensional vector. Future coding protocols may define additional types of deblocking parameters, which may be represented as 3, 4 or larger dimensional spaces when considered in context of the method 600 of FIG. 11.

When the comparison of box 640 determines that the error exceeds the threshold, the method 600 may perform a multi-dimensional search for a new deblocking vector. Specifically, the method 600 may advance the current vector separately in each dimension i according to a governing search direction for dimension i (box 660). The method 600 may perform deblocking of the decoded picture using parameters associated with each of the advanced vectors (box 670) and compute an error between the original picture and the deblocked picture (box 680). In an N-dimensional vector space, there may be N deblocked pictures and N error values obtained therefrom. The method 600 may compute a gradient value by comparing the error value obtained at box 630 to the errors obtained from each dimensional calculation in box 680 (box 690). The method 600 may generate a new vector from the gradient (box 700) and perform another iteration of analysis, returning to box 620.

The gradient vector may be an N-dimensional vector where the component of each dimension i may be obtained by a comparison of the deblocking error from box 630 to the dimensional error obtained from box 680. For example, the gradient vector G may be computed as:

$$G = [G_1, G_2, \ldots, G_N], \text{where } G_i = (err_i - err_{DBLK}) \cdot DIR_i$$

for each component $G_i$ of the gradient vector. In the foregoing equation, $DIR_i$ represents a governing search direction for the respective dimension, having values −1 or 1.

The method 600 further may generate a new deblocking vector V as:

$$V_{new} = V_{old} - \frac{w*G}{|G|},$$

where w represents a step size of the algorithm and each dimensional component $V_i$ is rounded to have integer values. The step size w is a programmable value that, typically, is set based on the size of the deblocking vector space in each dimension.

As applied to an H.264 implementation, for example, the method 600 may generate a gradient vector G as $G=[(err_\alpha - err_{DBLK})\cdot DIR_\alpha, (err_\beta - err_{DBLK})\cdot DIR_\beta]$, where $err_\alpha$ and $err_\beta$ are error values obtained by box 380 and $DIR_\alpha$ and $DIR_\beta$ represent search direction indicators in the α and β dimensions respectively. The method 600 further may generate a new deblocking vector $[\alpha,\beta]_{new}$ as:

$$[\alpha, \beta]_{new} = [\alpha, \beta]_{old} - \frac{w*G}{|G|},$$

where again, $[\alpha,\beta]_{new}$ is rounded to have integer values. In practice, a value of w=1.4 may give satisfactory results.

It is expected that, during operation, the gradient search method 600 of FIG. 11 may converge upon a set of deblocking parameters that generate an error lower than the threshold (box 640) through several iterations. Other embodiments of the method 600 accommodate other tests to terminate operation before an acceptably low error situation has been achieved.

For example, after the coded picture has been decoded (box 610), the method 600 may compute a decoding error and compare it to another threshold (box 710). If the decoding error is less than a threshold, the method 600 may cause the coded picture to be transmitted to a decoder without deblocking parameters (box 720). Such a test advantageously determines that deblocking is unnecessary to achieve appropriate image quality and, therefore, the processing resources required to perform the operations of boxes 620-700 may be conserved.

In another embodiment, if the error determined at box 640 is greater than the threshold, the method 600 further may determine a change in error between the current iteration and a prior iteration (shown as "Δerror"). When a first iteration is being executed, it is permissible to derive Δerror from the current error value and the decoding error value obtained at box 710. Alternatively, the first iteration may omit box 720. The method 600 may compare the Δerror value to another threshold (box 730). If the Δerror value exceeds a predetermined threshold, it may suggest that a rate of convergence of the gradient search method is unlikely to improve image enhancement sufficiently to warrant further execution of the method 600. In this case, the method 600 may advance to box 650 and transmit data of the coded picture and the deblocking vector to the decoder.

In a further embodiment, after the method 600 sets a new vector (box 700), the method 600 may determine whether the new vector has been used during some earlier iteration of the method (box 740). If so, it may indicate the further execution of the method 600 is unlikely to improve image enhancement beyond the results obtained through to the current iteration. In this case, the method 600 may advance to box 650 and transmit to the decoder data of the coded picture and the deblocking vector obtained prior to operation of box 700.

And, in yet another embodiment, the method 600 may terminate if a predetermined number of iterations of boxes 620-700 have been performed without generating a sufficiently low error to reach box 650.

In many implementations, the range of possible values of each deblocking parameter dimension will be finite. For example, in an H.264 implementation, α and β values each must be integers having a value between −6 and 6. In an embodiment, if the process of advancing a vector in a particular dimension i (box 660) would cause the advanced value to go beyond a legal value (for example, α=−7), then the advanced value should be set to the limit value (α=−6) and the processing of boxes 670-680 associated with the respective dimension may be omitted. In that case, the error value associated with the respective dimension may be estimated to equal the error value derived at box 630.

In a further embodiment, when the method 600 computes a gradient from the error values (box 690), the method 600 further may compute a ratio of the gradient's magnitude to the deblocking error obtained at box 630 and compare the ratio to another threshold (box 750). If the ratio is less than the threshold, the method 600 may advance to box 650 and transmit to the decoder data of the coded picture and the deblocking vector used at box 620.

During implementation, the threshold values used for comparison at boxes 640, 710 and 730-750 may be programmable values that can be tuned to suit individual needs. The thresholds may be set as static, pre-programmed values. Alternatively, they may vary dynamically during operation. For example, threshold values may vary based on a type of coding operation assigned to a respective picture (e.g., I-, P- or B-coding) or may vary based on a quantization parameter used to code the picture. The threshold values may vary based on a target bitrate budget that governed coding operations at the encoder. Moreover, the threshold values may vary based on data that describes a target decoder, for example, large screen devices (laptops, tablet computers) or small screen device (portable media players, smart phones) for which the video data is being coded.

Figure 12:
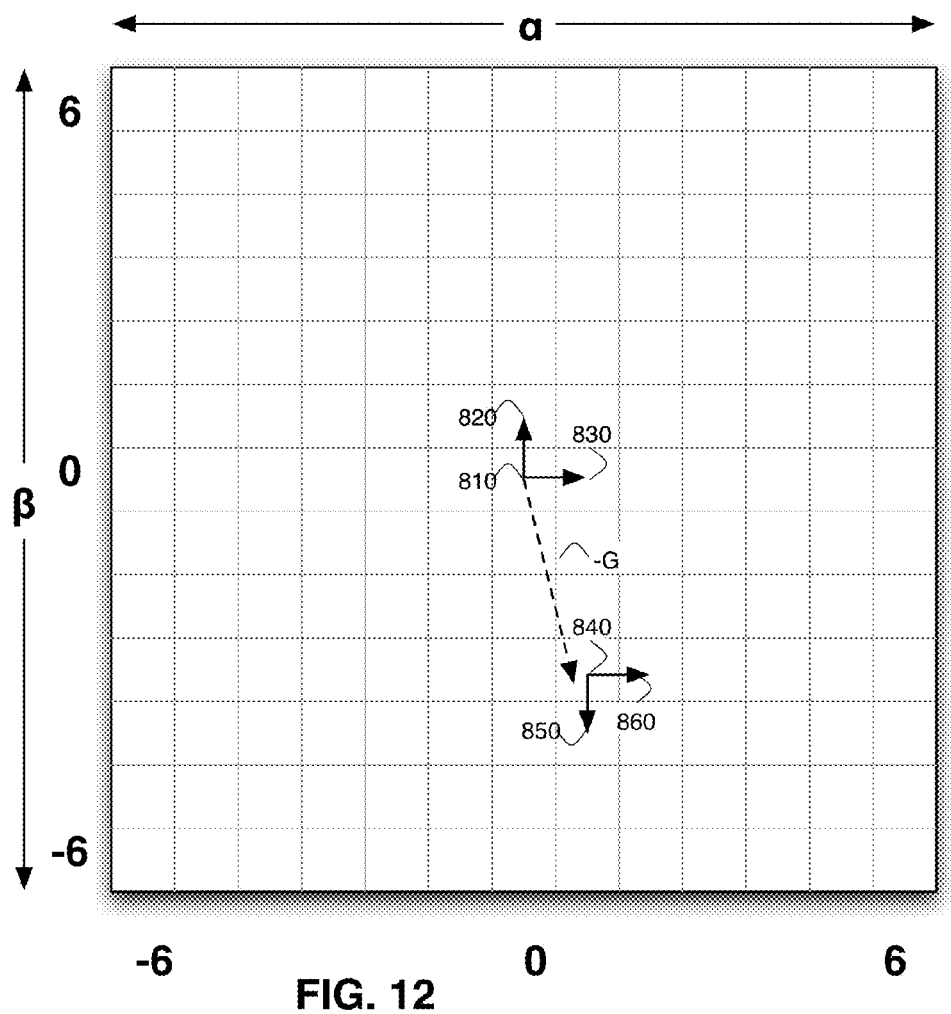
FIG. 12 illustrates exemplary operation of a gradient search method according to another embodiment of the present invention.

FIG. 12 illustrates operation of the gradient search method of FIG. 11 performed upon an exemplary deblocking matrix. As shown, the deblocking matrix is a two-dimensional 13×13 matrix that is indexed by values α, β. This example corresponds to the deblocking matrix that may be used in an H.264 implementation. Each cell location indexed by the α and β values is associated with a set of deblocking parameters that may be applied by a decoder. During operation, an encoder may transmit identifiers of α and β, which the decoder uses to retrieve deblocking filter parameters from a stored matrix.

In a first iteration of the method, deblocking vector 810 may be set to a default value, for example, [0,0]. A first deblocking operation may be performed using parameters associated with the deblocking vector 810. Assuming the error obtained therefrom is insufficient to terminate the method, the deblocking vector may be advanced in each dimension according to a default direction. In a two-dimensional vector space, this results in a pair of incremented vectors 820, 830. A pair of deblocking operations may be performed, each using parameters associated with a respective incremented vector 820, 830. A gradient vector G may be derived from error values associated with the pair of deblocking operations and the error value obtained from the original deblocking vector 810. Thereafter, another iteration may be performed using an updated deblocking vector 840 derived from the gradient vector G and, if the error obtained therefrom is insufficient to terminate operation of the method, another pair of advanced vectors 850, 860 may be computed. In the second iteration, the dimensional vectors 850, 860 may be advanced in a direction corresponding to the negative of the gradient vector G of the first iteration. The operation may continue, generating new deblocking vectors, incremented deblocking vectors and gradient vectors (not shown) until a stopping point is reached.

Operation of the method of FIG. 11, in a two-dimensional case, may be performed by the following process flow:

```
Code current picture.
Decode current picture.
E0 ← MSE of the decoded unblocked picture (current picture-decoded
  picture).
If E0 < t1:
  Transmit:
    compressed bits of picture and
    deblocking parameters (indicating no deblocking).
  Store decoded unblocked picture in reference picture cache as
    reference in the motion compensated coding of future
    pictures.
  End process for current picture.
Else,
  Set deblocking parameter vector [A0, B0] = [*,*] to indicate no
    deblocking
  Set deblocking parameter vector [A1, B1] = [0, 0].
  Establish temporary stores TS0 and TS1 to hold pictures.
  Set gradient coefficients GA = 1 and GB = 1.
  TS0 ← decoded unblocked picture.
PT.1: Deblock the decoded picture with parameters taken from vector
  [A1, B1]
  TS1 ← deblocked picture.
  Compute mean square error E1 between the original and deblocked
    picture.
  If E1 < te:
    Transmit:
      compressed bits of picture and
      deblocking parameters A1 and B1
    Store TS1 to reference picture cache.
    End process for current picture.
  Else, if E1/E0 > ti:
    Transmit:
      compressed bits of picture and
      deblocking parameters A0 and B0
    Store TS0 to reference picture cache.
    End process for current picture.
  If [A1+GA, B1] = [A0, B0], set E2 ← E0.
  Else, set E2 ← E1.
  If [A1+GA, B1] ≠ [A0, B0] and |A1+GA| ≤ 6:
    Deblock decoded picture using parameters taken from vector
      [A1+GA, B1]
    Compute mean square error E2 between the original and deblocked
      picture.
  If [A1, B1+GB] = [A0, B0], set E3 ← E0.
  Else, set E3 ← E1.
  If [A1, B1+GB] ≠ [A0, B0] and |B1+GB| ≤ 6:
    Deblock decoded picture using parameters taken from vector [A1,
      B1+GB]
    Compute mean square error E3 between the original and deblocked
      picture.
  Compute gradient vector G as G = [(E2 − E1) x GA, (E3 − E1) x GB].
  If |G|/E1 < ts:
    Transmit:
      compressed bits of picture and
      deblocking parameters A1 and B1
    Store TS1 to reference picture cache.
    End process for current picture.
  Else,
    set deblocking parameter vector [A0, B0] = [A1, B1]
    set E0 = E1 and
    set TS0 ← TS1
    if | E1−E2 | > ta, set GA = sign( (E1 − E2) x GA )
    if | E1−E3 | > tb, set GB = sign( (E1 − E3) x GB )
    Store [A1, B1] to history table.
    Compute new deblocking parameter vector [A1, B1] ← [A1, B1] − w ×
      G/|G|, where the new A1 and B1 are rounded to integers in the
      range [−6,6].
    If [A1, B1] matches history table:
      Transmit:
        compressed bits of picture and
        deblocking parameters A0 and B0
      Store TS0 to reference picture cache.
      End process for current picture.
    Else, perform next iteration, starting at PT. 1, with the new vector
      [A1, B1].
```

In the foregoing methods, the value w represents a stride length to be used during computation of the gradient vector G within the deblocking matrix. As indicated above, the stride length w can be set to a predetermined value, such as 1.4. In another embodiment, the stride length w may be set dynamically. For example, the stride length w may be set to a larger value (such as 3.5) and be refined during operation of the methods. In such an embodiment, the stride length w may be reduced by a scaling factor according to w=a*w (where a<1) or w=w−a. Further, the reduction in the stride length w may be set dynamically based on observable error in performance of the deblocking filters. When each new deblocking operation (boxes 320 or 620 above) is performed, a comparison may be made between the deblocking error of the present iteration and the deblocking error of a prior iteration. If the ratio between error values is lower than a predetermined threshold (e.g., $|e_{i+1}/e_i|>$th), the stride length may be revised more aggressively than if the ratio exceeds the threshold.

In the foregoing embodiments, the methods 300 and 600 initialized the deblocking vector of the first iteration to the center of the deblocking matrix (e.g., [0,0]). Other embodiments may initialize the deblocking vectors to other values to speed up convergence. For example, in one embodiment, the deblocking vector initially may be set to a vector finally obtained during execution of the method on a prior picture. Alternatively, the deblocking vector initially may be set to a vector finally obtained during processing of a prior picture of a common coding type (e.g., a prior B picture when operating on a B picture or a prior P picture when operating on a P picture). In yet another embodiment, initial deblocking vectors may be set to values of vectors obtained during processing of prior pictures that exhibit similar motion vectors or refer to common reference pictures as the picture being processed. Alternatively, the deblocking vector may be set initially to a value obtained from processing of other pictures that exhibit common coding parameters such as quantization parameters, pixel aspect ratio, coding rate, noise level or image complexity.

The principles of the present invention find application with a variety of types of error computation. For example, error calculations performed at boxes 330 and 380 (FIG. 9) or at boxes 630 and 680 (FIG. 11) may be calculated by calculating the mean squared error between the pictures at issue, of the form $$err = \sum_{i,j} (p1_{i,j} - p2_{i,j})^2,$$

where p1, p2 represent pixels from a pair of frames and i,j represent pixel locations within the pictures. The error values may be scalar values that can be compared to thresholds.

In another embodiment, the error computation may be performed as a weighted mean squared error computation of the form $$err = \sum_{i,j} d_{i,j} \cdot (p1_{i,j} - p2_{i,j})^2,$$

where $d_{i,j}$ represents a distance of a respective pixel from a nearest boundary between decoded blocks. Such an embodiment may assign relatively higher weights to errors that occur at block boundaries where blocking artifacts tend to be most noticeable.

In a further embodiment, the error computation may sum the errors of each pixel that are within a predetermined distance from an edge of a block boundary and exhibit a common sign mathematically. The error of each pixel may be weighted according to the distance from the edge. The result may be squared and averaged over the picture. In this embodiment, the error computation not only assigns greater weight to pixels near block edges but also may give greater weight to common errors along edges. Errors having a common sign tend to be more visible than random noise errors.

In another embodiment, instead of using a mean square error criterion, the error computation may be performed using error models that consider subjectively meaningful error. For example, the error computation may calculate a Minimum Viewing Distance ("MVD") for no noticeable distortion between the original and the coded video. This metric is also referred to as the minimum viewing distance for zero Just Noticeable Distortion ("JND"). In this embodiment, JND values may be computed as disclosed in the co-pending application Ser. No. 12/415,340, entitled "Quality Metrics for Coded Video Using Just Noticeable Difference Models." In boxes 340 (FIG. 9) or 640 (FIG. 11), if the MVD calculated is less than a predetermined threshold, the method may advance to boxes 350 or 650 respectively.

In the foregoing discussion, error computations have been discussed as determining an error between a source picture and a decoded, deblocked picture. In another embodiment, the error computation may be performed using filtered source pictures rather than unfiltered source pictures. In this manner, the foregoing methods would compute an error between filtered uncoded current mcblocks and deblocked coded current mcblocks over each picture (or part of a picture). The filters used to filter the uncoded current mcblocks need not be standardized or communicated to the decoder. They may adapt to parameters such as those mentioned above, or to others unknown to the decoder such as level of noise in the incoming video. They may emphasize high spatial frequencies in order to give additional weighting to sharp edges.

Figure 13:
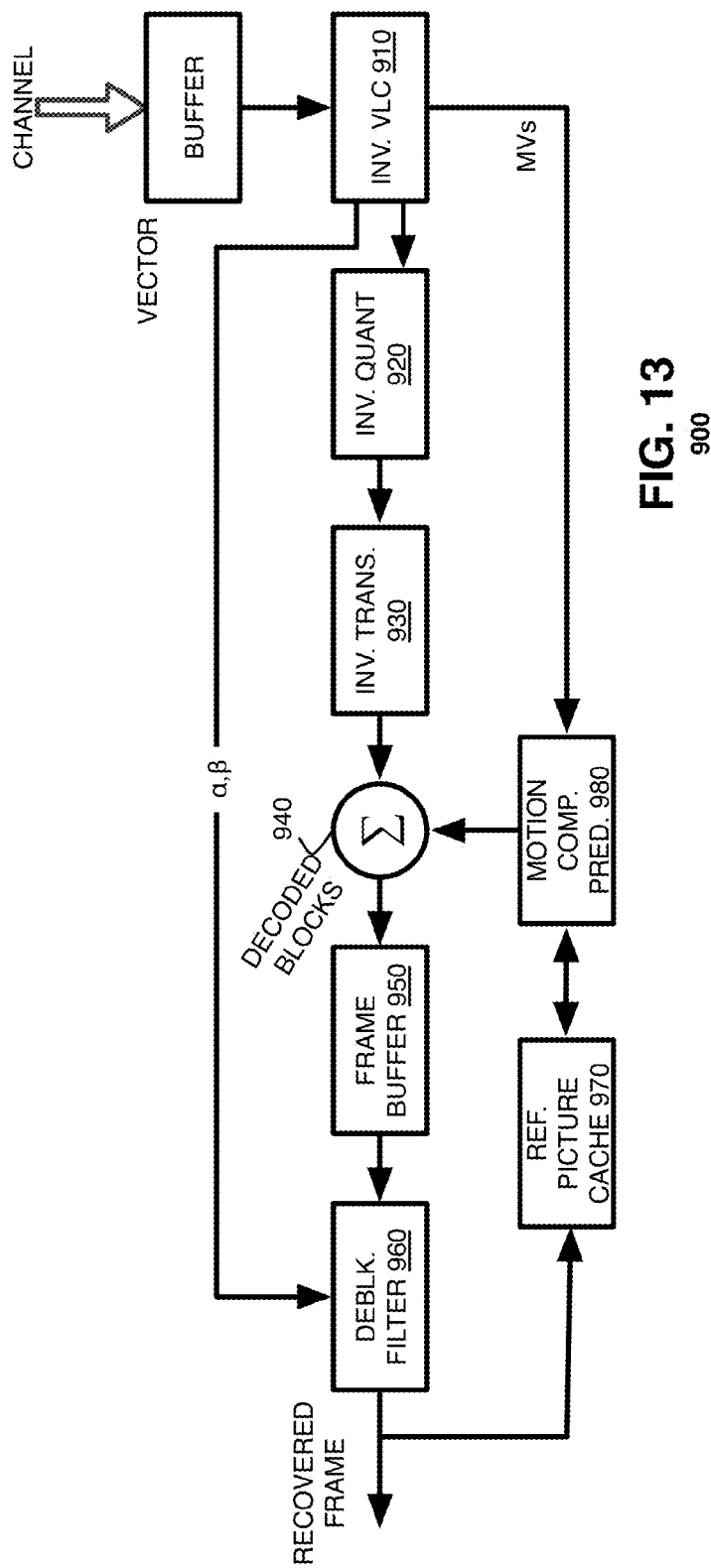
FIG. 13 is a simplified block diagram of a video decoder according to an embodiment of the present invention.

FIG. 13 is a simplified block diagram of a decoder 900 according to an embodiment of the present invention. The decoder 900 may include a variable length decoder 910, an inverse quantizer 920, an inverse transform unit 930, an adder 940, a frame buffer 950 and a deblocking filter 960. The decoder 900 further may include a prediction unit that includes a reference picture cache 970 and a motion compensated predictor 980.

The variable length decoder 910 may decode data received from a channel buffer. The variable length decoder 910 may route coded coefficient data to an inverse quantizer 920, motion vectors to the motion compensated predictor 980 and deblocking vector data to the deblocking filter 960. The inverse quantizer 920 may multiply coefficient data received from the inverse variable length decoder 910 by a quantization parameter. The inverse transform unit 930 may transform dequantized coefficient data received from the inverse quantizer 920 to pixel data. The inverse transform unit 930, as its name implies, may perform the converse of transform operations performed by the transform unit of an encoder (e.g., DCT or wavelet transforms). The adder 940 may add, on a pixel-by-pixel basis, pixel residual data obtained by the inverse transform unit 930 with predicted pixel data obtained from the motion compensated predictor 980. The adder 940 may output recovered mcblock data, from which a recovered frame may be constructed and rendered at a display device (not shown). The frame buffer 950 may accumulate decoded mcblocks and build reconstructed frames therefrom. The deblocking filter 960 may perform deblocking filtering operations on recovered frame data according to filtering parameters identified by the channel.

Motion compensated prediction may occur via the reference picture cache 970 and the motion compensated predictor 980. The reference picture cache 970 may store recovered image data output by the deblocking filter 960 for frames identified as reference frames (e.g., decoded I- or P-frames). The motion compensated predictor 980 may retrieve reference mcblock(s) from the reference picture cache 970, responsive to mcblock motion vector data received from the channel. The motion compensated predictor may output the reference mcblock to the adder 940.

The foregoing discussion identifies functional blocks that may be used in video coding systems constructed according to various embodiments of the present invention. In practice, these systems may be applied in a variety of devices, such as mobile devices provided with integrated video cameras (e.g., camera-enabled phones, entertainment systems and computers) and/or wired communication systems such as videoconferencing equipment and camera-enabled desktop computers. In some applications, the functional blocks described hereinabove may be provided as elements of an integrated software system in which the blocks may be provided as separate elements of a computer program. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, the functional blocks described herein need not be provided as separate units. For example, although FIG. 8 illustrates the components of the block-based coding chain 210 and prediction unit 220 as separate units, in one or more embodiments, some or all of them may be integrated and they need not be separate units. Such implementation details are immaterial to the operation of the present invention unless otherwise noted above.

Several embodiments of the invention are specifically illustrated and/or described herein. However, it will be appreciated that modifications and variations of the invention are covered by the above teachings and within the purview of the appended claims without departing from the spirit and intended scope of the invention.

I claim:

1. A method of determining deblocking parameters for coded video, comprising, iteratively:
   performing deblocking of a decoded picture according to a deblocking vector,
   estimating a deblocking error from the deblocked, decoded picture, the estimated error determined from comparing the deblocked decoded picture to source picture data,
   if the estimated error exceeds a predetermined threshold, for each of a plurality of vector dimensions:
      incrementing the deblocking vector in the respective dimension, deblocking the decoded picture according to the advanced dimension, and
estimating a deblocking error from the decoded picture deblocked according to the advanced dimension;
revising the deblocking vector for a next iteration according to a gradient derived from the estimated deblocking errors of the vector dimensions.

2. The method of claim 1, further comprising, if the estimated error does not exceed the threshold, transmitting coded picture data and an identifier of the deblocking vector to a decoder.

3. The method of claim 1, further comprising repeating the method until the deblocking error is less than a predetermined threshold.

4. The method of claim 1, further comprising, on a second iteration of the method:
estimating a rate of change in estimated errors between a first iteration and the second iteration,
if the rate of change is less than a second threshold, transmitting coded picture data and an identifier of the deblocking vector to a decoder.

5. The method of claim 1, further comprising, if a magnitude of the gradient is less than a second threshold, transmitting coded picture data and an identifier of the deblocking vector to a decoder.

6. The method of claim 1, further comprising, on subsequent iterations of the method:
determining if the revised deblocking vector matches a deblocking vector used in previous iterations of the method,
if so, transmitting coded picture data and an identifier of the deblocking vector to a decoder.

7. The method of claim 1, wherein the incrementing comprises adjusting the deblocking vector in the respective dimension in a direction determined by the gradient of a prior iteration.

8. The method of claim 1, wherein the deblocking vector of a first iteration is set to a default value.

9. The method of claim 1, wherein the deblocking vector of a first iteration is set to a final deblocking vector value obtained by execution of the method on a prior picture.

10. The method of claim 1, wherein the deblocking vector of a first iteration is set to a final deblocking vector value obtained by execution of the method on a prior picture having a common coding assignment as a current picture.

11. The method of claim 1, wherein the deblocking vector of a first iteration is set to a final deblocking vector value obtained by execution of the method on a prior picture having similar motion properties as a current picture.

12. The method of claim 1, wherein the estimated error of the deblocked picture is determined from a comparison of the deblocked, decoded picture to unfiltered source picture data.

13. The method of claim 1, wherein the estimated error of the deblocked picture is determined from a comparison of the deblocked, decoded picture to filtered source picture data.

14. A video coding method, comprising:
coding blocks of source pictures by motion compensation,
decoding blocks of reference pictures, the decoding including:
estimating parameters of a deblocking filtering operation by an iterative gradient-based search process, and
deblocking filtering the decoded reference pictures according to final estimated deblocking parameters,
storing the deblocked picture in a reference picture store, and
transmitting data of the coded pictures and the final estimated deblocking parameters to a channel.

15. The method of claim 14, wherein the search process comprises, iteratively:
performing deblocking of the decoded picture according to a deblocking vector,
estimating a deblocking error from the deblocked, decoded picture,
if the estimated error exceeds a predetermined threshold, for each of a plurality of vector dimensions:
incrementing the deblocking vector in the respective dimension,
deblocking the decoded picture according to the advanced dimension, and
estimating a deblocking error from the decoded picture deblocked according to the advanced dimension;
revising the deblocking vector for a next iteration according to a gradient derived from the estimated deblocking errors of the vector dimensions.

16. The method of claim 15, further comprising, if the estimated error does not exceed the threshold, transmitting coded picture data and an identifier of the deblocking vector to a decoder.

17. The method of claim 15, further comprising repeating the method until the deblocking error is less than a predetermined threshold.

18. The method of claim 15, further comprising, on a second iteration of the method:
estimating a rate of change in estimated errors between a first iteration and the second iteration,
if the rate of change is less than a second threshold, transmitting coded picture data and an identifier of the deblocking vector to a decoder.

19. The method of claim 15, further comprising, if a magnitude of the gradient is less than a second threshold, transmitting coded picture data and an identifier of the deblocking vector to a decoder.

20. The method of claim 15, further comprising, on a subsequent iteration of the method:
determining if the revised deblocking vector matches a deblocking vector used in previous iterations of the method,
if so, transmitting coded picture data and an identifier of the deblocking vector to a decoder.

21. The method of claim 15, wherein the incrementing comprises adjusting the deblocking vector in the respective dimension in a direction determined by the gradient of a prior iteration.

22. The method of claim 15, wherein the deblocking vector of a first iteration is set to a default value.

23. The method of claim 15, wherein the deblocking vector of a first iteration is set to a final deblocking vector value obtained by execution of the method on a prior picture.

24. The method of claim 15, wherein the deblocking vector of a first iteration is set to a final deblocking vector value obtained by execution of the method on a prior picture having a common coding assignment as a current picture.

25. The method of claim 15, wherein the deblocking vector of a first iteration is set to a final deblocking vector value obtained by execution of the method on a prior picture having similar motion properties as a current picture.

26. The method of claim 15, wherein the estimated error of the deblocked picture is determined from a comparison of the deblocked, decoded picture to unfiltered source picture data.

27. The method of claim 15, wherein the estimated error of the deblocked picture is determined from a comparison of the deblocked, decoded picture to filtered source picture data.

28. A video encoder, comprising:
a block-based coder, having inputs for a source picture and predicted blocks,
a prediction unit, coupled to the block-based coder, comprising:
 a block based decoder, to decode coded blocks of reference pictures, the block based decoder including a deblocking filter, and control logic to estimate deblocking parameters by an iterative gradient-based search process, and
 a reference picture store for deblocked pictures, and
a transmit buffer to store data of the coded pictures and the final estimated deblocking parameters.

29. The encoder of claim 28, wherein the control logic iteratively:
 deblocks the decoded picture according to a deblocking vector,
 estimates a deblocking error from the deblocked, decoded picture,
 if the estimated error exceeds a predetermined threshold, for each of a plurality of vector dimensions:
  advances the deblocking vector in the respective dimension,
  deblocks the decoded picture according to the advanced dimension, and
  estimates a deblocking error from the decoded picture deblocked according to the advanced dimension;
 revises the deblocking vector for a next iteration according to a gradient derived from the estimated deblocking errors of the vector dimensions.

30. A video decoder, comprising:
a block-based decoder having inputs for coded picture data and predicted block data,
a prediction unit coupled to the block-based decoder to predict block data in response to motion vector data received in a channel, and
a deblocking filter receiving recovered block data from the block-based decoder and, responsive to a deblocking vector received in the channel, perform deblocking using parameters identified by the deblocking vector, the deblocking vector having been generated by an iterative gradient-based search process.

* * * * *